US012676095B2

(12) United States Patent
Lim et al.

(10) Patent No.: US 12,676,095 B2
(45) Date of Patent: Jul. 7, 2026

(54) ELECTRONIC DEVICE FOR PROJECTING IMAGE AND OPERATING METHOD OF THE SAME

(71) Applicant: SAMSUNG ELECTRONICS CO., LTD., Suwon-si (KR)

(72) Inventors: Hyungjun Lim, Suwon-si (KR); Hyunku Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/048,052

(22) Filed: Feb. 7, 2025

(65) Prior Publication Data

US 2025/0292715 A1 Sep. 18, 2025

Related U.S. Application Data

(63) Continuation of application No. PCT/KR2025/000053, filed on Jan. 2, 2025.

(30) Foreign Application Priority Data

Mar. 18, 2024 (KR) ........................ 10-2024-0037386

(51) Int. Cl.
*G09G 3/20* (2006.01)

(52) U.S. Cl.
CPC ... *G09G 3/2007* (2013.01); *G09G 2320/0233* (2013.01); *G09G 2320/0686* (2013.01)

(58) Field of Classification Search
None
See application file for complete search history.

(56) References Cited

U.S. PATENT DOCUMENTS 7,303,285 B2 * 12/2007 Inoue ..................... H04N 9/317 353/70
9,304,379 B1 4/2016 Wang et al.
(Continued)

FOREIGN PATENT DOCUMENTS

CN 112782923 A 5/2021
CN 115705810 A 2/2023
(Continued)

OTHER PUBLICATIONS

Search Report and Written Opinion dated Apr. 9, 2025 issued in International Patent Application No. PCT/KR2025/000053.

*Primary Examiner* — Kenneth Bukowski
(74) *Attorney, Agent, or Firm* — Nixon & Vanderhye P.C.

(57) ABSTRACT

An electronic device configured to project an image includes: an image projection unit comprising a projector configured to project the image onto a projection area, memory storing at least one instruction, and at least one processor, comprising processing circuitry, individually and/or collectively, configured to execute the at least one instruction stored in the memory and to: determine a reference line including information about a point in the projection area, the point being farthest from the image projection unit, generate a distance correction coefficient for correcting an input grayscale of an input image, based on the reference line, and control the image projection unit to display a corrected image including a corrected grayscale generated by multiplying the input grayscale by the distance correction coefficient.

19 Claims, 17 Drawing Sheets

(56) References Cited

U.S. PATENT DOCUMENTS

| | | | | |
|---|---|---|---|---|
| 9,883,153 | B2 | 1/2018 | Naganuma | |
| 10,880,530 | B2 | 12/2020 | Miao | |
| 11,303,859 | B2 | 4/2022 | Dutton et al. | |
| 11,336,878 | B2 | 5/2022 | Yoon et al. | |
| 2002/0134839 | A1 * | 9/2002 | Iwaki | G01B 11/2509 235/454 |
| 2004/0252283 | A1 * | 12/2004 | Ogawa | H04N 9/3185 353/69 |
| 2018/0061372 | A1 | 3/2018 | Ano | |
| 2018/0091784 | A1 | 3/2018 | Dutton et al. | |
| 2021/0144348 | A1 * | 5/2021 | Matsumoto | H04N 9/3155 |
| 2021/0350501 | A1 | 11/2021 | Yamauchi | |

FOREIGN PATENT DOCUMENTS

| | | | | |
|---|---|---|---|---|
| JP | 2011205199 | A | * | 10/2011 |
| JP | 2017037190 | A | * | 2/2017 |
| JP | 2018-036471 | A | | 3/2018 |
| JP | 2021-076719 | A | | 5/2021 |
| JP | 2021177218 | A | | 11/2021 |
| JP | 7071694 | B2 | | 5/2022 |
| KR | 6658520 | B2 | | 2/2020 |
| KR | 10-2021-0123059 | A | | 10/2021 |
| KR | 10-2023-0092682 | A | | 6/2023 |

* cited by examiner

ELECTRONIC DEVICE FOR PROJECTING IMAGE AND OPERATING METHOD OF THE SAME

CROSS-REFERENCE TO RELATED APPLICATIONS

This application is a continuation of International Application No. PCT/KR2025/000053 designating the United States, filed on Jan. 2, 2025, in the Korean Intellectual Property Receiving Office and claiming priority to Korean Patent Application No. 10-2024-0037386, filed on Mar. 18, 2024, in the Korean Intellectual Property Office, the disclosures of each of which are incorporated by reference herein in their entireties.

BACKGROUND

Field

The disclosure relates to an electronic device and an operating method of the electronic device. For example, the disclosure relates to an electronic device for projecting an image, and an operating method of the electronic device.

Description of Related Art

With the development in electronic device technology, various electronic devices for providing an image to a user are developed and provided.

Also, with the development in optical technology, a projector-type electronic device for providing an image to a user by projecting the image onto a screen or a particular space is being developed and provided.

A projector for projecting an image may randomly determine, via an image projection unit, an area onto which an image is to be projected in a space including the projector. For example, according to an arrangement of the projector, an image may be projected onto an area adjacent to the image projection unit or may be projected onto an area remotely distant from the image projection unit. Also, the image projection unit may project an image onto at least two surfaces.

Here, when a distance between a projection area onto which an image is to be projected and the image projection unit is not regular, an image having a grayscale different from a grayscale of an image that the image projection unit attempts to display may be displayed on the projection area, due to the distance difference. For example, an image having a grayscale darker than a grayscale of an image that the image projection unit attempts to display may be displayed in an area of the projection area, the area being distant from the image projection unit.

Accordingly, an image having an unintentionally-irregular grayscale may be provided to a user.

SUMMARY

An example embodiment of the disclosure provides an electronic device for projecting an image. The electronic device may include: an image projection unit comprising a projector configured to project the image onto a projection area; memory storing at least one instruction; at least one processor, comprising processing circuitry, individually and/or collectively, configured to execute the at least one instruction stored in the memory and to: determine a reference line including information about a point in the projection area, the point being farthest from the image projection unit; generate a distance correction coefficient for correcting an input grayscale of an input image, based on the reference line; and control the image projection unit to display a corrected image including a corrected grayscale generated by multiplying the input grayscale by the distance correction coefficient.

An example embodiment of the disclosure provides a method of operating an electronic device projecting an image. The method of operating the electronic device may include: determining a reference line including information about a point in a projection area onto which the image is projected, the point being farthest from an image projection unit; generating a distance correction coefficient for correcting an input grayscale of an input image, based on the reference line; and displaying, as the image, a corrected image including a corrected grayscale generated by multiplying the input grayscale by the distance correction coefficient, via an image projection unit including a projector.

An example embodiment of the disclosure provides a non-transitory computer-readable recording medium having recorded thereon a program for performing at least one of the operating methods, on a computer.

The technical features of the disclosure are not limited to the aforementioned features, and other unstated technical features will be clearly understood by one of ordinary skill in the art in view of descriptions below.

BRIEF DESCRIPTION OF THE DRAWINGS

The disclosure will now be described in greater detail below with reference to the accompanying drawings, in which reference numerals denote structural elements. Further, the above and other aspects, features and advantages of certain embodiments of the present disclosure will be more apparent from the following detailed description, taken in conjunction with the accompanying drawings, in which.

DETAILED DESCRIPTION

Figure 1:
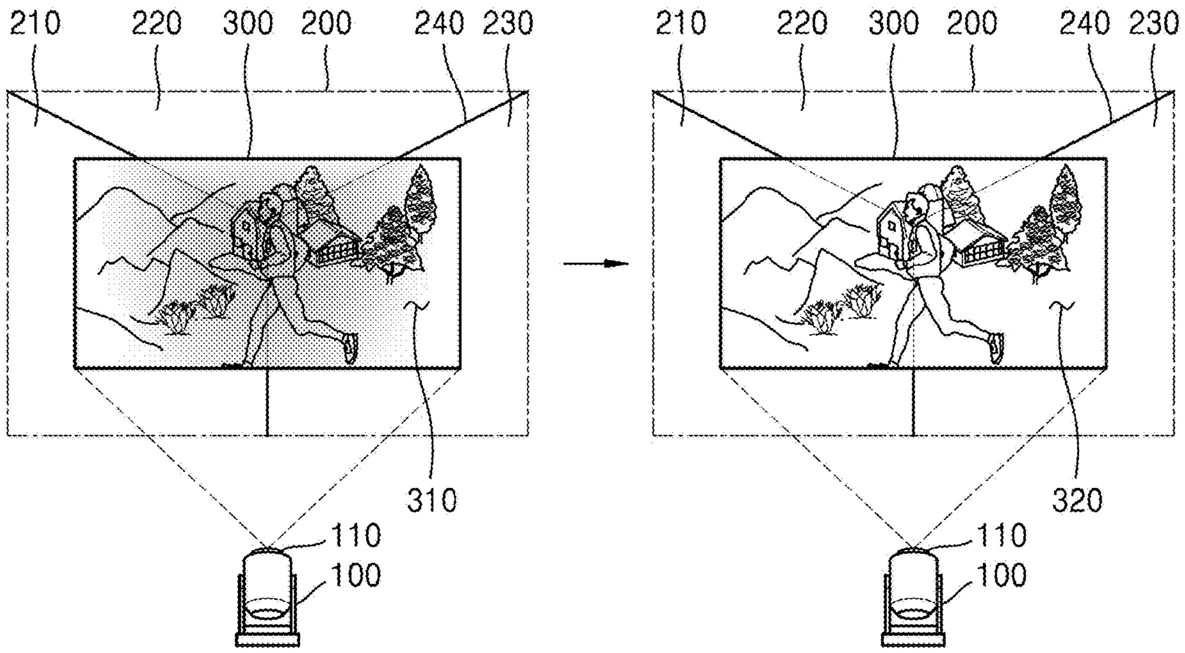
FIG. 1 is a diagram illustrating an example operation of an electronic device according to various embodiments.

The terms used in the disclosure will be briefly defined, and various example embodiments of the disclosure will be described in greater detail.

Although the terms used in the disclosure are selected from among common terms that are currently widely used in consideration of their functions in an embodiment of the disclosure, the terms may vary according the intention of one of ordinary skill in the art, a precedent, or the advent of new technology. In some cases, terms may be arbitrarily selected, and the meaning of those terms will be described in detail in the corresponding part of the detailed description. Therefore, the terms used in the disclosure are not merely designations of the terms, but the terms are defined based on the meaning of the terms and content throughout the disclosure.

As used herein, the singular forms "a," "an," and "the" may include the plural forms as well, unless the context clearly indicates otherwise. Unless otherwise defined, all terms including technical or scientific terms used herein may have the same meanings as commonly understood by one of ordinary skill in the art of the disclosure.

In the disclosure, when a part "includes" or "comprises" an element, unless there is a particular description contrary thereto, the part can further include other elements, not excluding the other elements. Also, the terms such as ". . . unit," "module," or the like used in the disclosure indicate a unit, which processes at least one function or operation, and the unit may be implemented by hardware or software, or by a combination of hardware and software.

The expression "configured to (or set to)" used in the disclosure may be replaced with, for example, "suitable for," "having the capacity to," "designed to," "adapted to," "made to," or "capable of" according to cases. The expression "configured to (or set to)" may not necessarily refer to "specifically designed to" in a hardware level. Instead, in some cases, the expression "system configured to . . . " may refer, for example, to the system being "capable of . . . " along with other devices or parts. For example, "a processor configured to (or set to) perform A, B, and C" may refer to a dedicated processor (e.g., an embedded processor) for performing a corresponding operation, or a general-purpose processor (e.g., a central processing unit (CPU) or an application processor (AP)) capable of performing a corresponding operation by executing one or more software programs stored in memory.

In the disclosure, it should be understood that when elements are "connected" or "coupled" to each other, the elements may be directly connected or coupled to each other, but may alternatively be connected or coupled to each other with an element therebetween, unless specified otherwise.

Hereinafter, various example embodiments of the disclosure will be described in greater detail with reference to the accompanying drawings. However, the disclosure may be embodied in many different forms and should not be understood as being limited to any particular embodiment set forth herein. In addition, in the drawings, parts irrelevant to the description may be omitted to clearly describe an embodiment of the disclosure, and like elements are denoted by like reference numerals throughout the disclosure.

Hereinafter, various embodiments of the disclosure will be described in greater detail with reference to the drawings.

Figure 2:
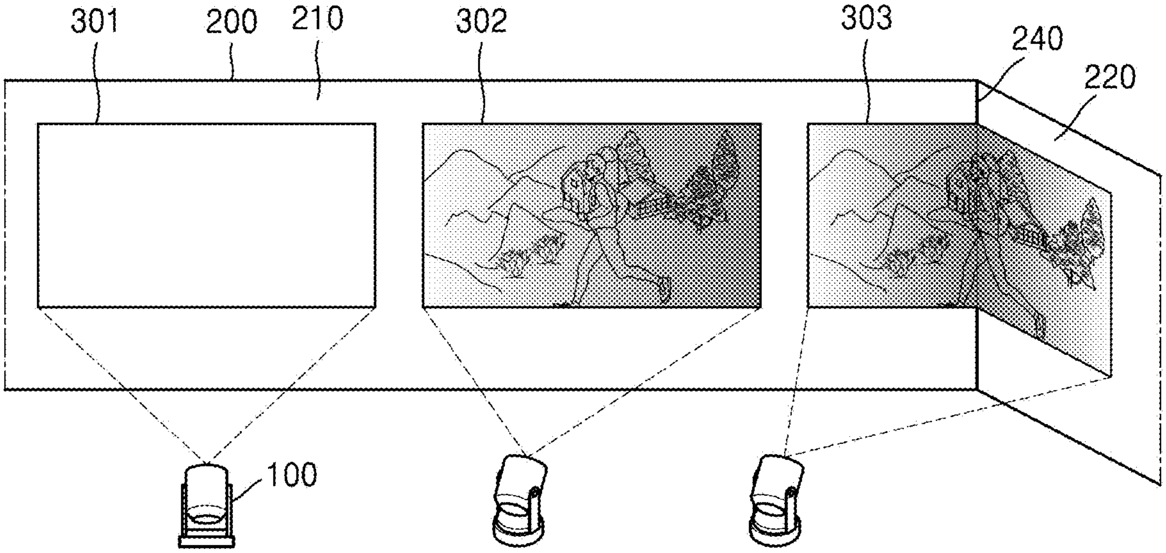
FIG. 2 is a diagram illustrating an example effect due to an operation of the electronic device, according to various embodiments.

FIG. 1 is a diagram illustrating an example operation of an electronic device according to various embodiments. FIG. 2 is a diagram illustrating an effect due to an operation of the electronic device, according to various embodiments.

Referring to FIG. 1, according to an embodiment of the disclosure, an electronic device 100 may be a device for projecting an image 310 or 320 onto a space 200. The electronic device 100 may project the image 310 or 320 onto the space 200 so as to provide the image 310 or 320 to a user who uses the electronic device 100.

According to an embodiment of the disclosure, an area of the space 200 onto which the image 310 or 320 is to be projected may be referred to as a projection area 300. The projection area 300 may be an area on which the image 310 or 320 projected from the electronic device 100 is displayed. According to an embodiment of the disclosure, the space 200 may be an area in which not only the projection area 300 but also the electronic device 100 are arranged. The projection area 300 may include, but is not limited to, not only a screen but also include an object, a wall, or a ceiling included in the space 200.

Referring to FIG. 1, the electronic device 100 is illustrated as a projector for projecting the image 310 or 320 onto the projection area 300. According to an embodiment of the disclosure, the electronic device 100 may display the image 310 or 320 onto the projection area 300, thereby providing the image 310 or 320 to a user.

According to an embodiment of the disclosure, the electronic device 100 may be a stationary projector fixed to a particular position or a mobile projector arrangeable at a desired position.

According to an embodiment of the disclosure, the electronic device 100 of FIG. 1 has a round shape, but the disclosure is not limited thereto. The electronic device 100 may have various shapes including a square shape.

Although FIG. 1 illustrates that the electronic device 100 is arranged at a particular position so as to face the projection area 300, but the disclosure is not limited thereto. According to how the electronic device 100 provides the image 310 or 320, a relation between a position at which the electronic device 100 is arranged and the projection area 300 on which the image 310 or 320 is displayed may be determined. For example, the projection area 300 may be positioned in an upward direction from a position at which the electronic device 100 is arranged.

According to an embodiment of the disclosure, at least one of a size of the projection area 300, a shape of the projection area 300, or a position of the projection area 300 in the space 200 may be determined according to the specification of the electronic device 100, a position of the electronic device 100 in the space 200, a distance between the projection area 300 and the electronic device 100, etc.

According to an embodiment of the disclosure, the electronic device 100 may include an image projection unit (e.g., a projector) 110 for projecting the image 310 or 320. The projection area 300 may be determined as an area onto which the electronic device 100 attempts to project the image 310 or 320 via the image projection unit 110.

According to an embodiment of the disclosure, the electronic device 100 may project the image 310 or 320 onto two or more surfaces 210, 220, and 230 included in the space 200. Each of the two or more surfaces 210, 220, and 230 included in the space 200 may indicate a wall, a screen, or the like. In this case, two or more surfaces may be determined as the projection area 300. While FIG. 1 illustrates that the electronic device 100 displays the image 310 or 320 on the three surfaces 210, 220, and 230, the disclosure is not limited thereto. Also, the projection area 300 may correspond to some areas of the three surfaces 210, 220, and 230.

According to an embodiment of the disclosure, according to a position or an arrangement of the electronic device 100 in the space 200, distances between respective surfaces included in the projection area 300 and the image projection unit 110 may vary. According to an arrangement or a shape of the space 200, distances between respective surfaces included in the projection area 300 onto which the image 310 or 320 is projected and the image projection unit 110 may vary. For example, distances between a plurality of areas included in the projection area 300 and the image projection unit 110 may be different from each other.

Hereinafter, for descriptions, the image 310 or 320 is referred to as the first image 310 and the second image 320. Here, the first image 310 may indicate an image the electronic device 100 projects to the projection area 300 without performing, on an input grayscale of an obtained input image, correction of a grayscale difference due to a distance difference between the image projection unit 110 and the projection area 300.

The second image 320 may indicate an image the electronic device 100 projects to the projection area 300 by performing, on an input grayscale of an obtained input image, correction of a grayscale difference due to a distance difference between the image projection unit 110 and the projection area 300.

According to an embodiment of the disclosure, the more the distance between the image projection unit 110 and the projection area 300 increases, the more the grayscale of the first image 310 projected from the image projection unit 110 and displayed on the projection area 300 may decrease. Accordingly, the first image 310 having different grayscales may be displayed on a plurality of surfaces. As the first image 310 displayed on the plurality of surfaces has the different grayscales, a user may recognize that the first image 310 is differently viewed at boundaries of the plurality of surfaces.

A distance difference between the image projection unit 110 and the projection area 300 may occur in each of the plurality of surfaces. Accordingly, the first image 310 with a high grayscale may be displayed on a projection area included in a surface positioned relatively close to the image projection unit 110, and the first image 310 with a low grayscale may be displayed on a projection area included in a surface positioned relatively distant from the image projection unit 110.

Accordingly, the first image 310 having different grayscales may be displayed on a plurality of surfaces, according to distances to the image projection unit 110. As the first image 310 displayed on the plurality of surfaces has different grayscales, the user may recognize that the first image 310 has a low grayscale as the projection area 300 becomes distant from the image projection unit 110.

Even when the projection area 300 includes one surface, a distance difference between the image projection unit 110 and the projection area 300 may occur, according to a position or an arrangement of the electronic device 100 in the space 200. A distance difference between the image projection unit 110 and the projection area 300 may even occur in the one surface, according to an arrangement or a shape of the space 200. In this case, the user may also recognize that the first image 310 has a low grayscale as the projection area 300 becomes distant from the image projection unit 110.

Referring to FIGS. 1 and 2, according to an embodiment of the disclosure, FIG. 2 illustrates a plurality of projection areas 301, 302, and 303 according to positions and arrangements of the electronic device 100 in the space 200.

According to an embodiment of the disclosure, the space 200 may include the first surface 210, the second surface 220, and an edge 240 that is a boundary between the first surface 210 and the second surface 220.

According to an embodiment of the disclosure, the projection area 300 of a case in which the electronic device 100 projects the first image 310 squarely onto the first surface 210 may be referred to as the first project area 301. A distance between the image projection unit 110 included in the electronic device 100 and the first project area 301 may be regular. A distance between a partial area included in the first project area 301 and the image projection unit 110 may be equal to a distance between other area included in the first project area 301 and the image projection unit 110.

In this case, as there is no distance irregularity between the image projection unit 110 and the first project area 301, a grayscale irregularity due to the distance irregularity may not be included in the first image 310 projected onto the first project area 301.

According to an embodiment of the disclosure, the projection area 300 of a case in which the electronic device 100 projects the first image 310 slantly onto the first surface 210 may be referred to as the second project area 302. Here, a distance between the image projection unit 110 and the second project area 302 may not be regular. A distance between a partial area included in the second project area 302 and the image projection unit 110 may be different from a distance between other area included in the second project area 302 and the image projection unit 110.

In this case, as there is a distance irregularity between the image projection unit 110 and the second project area 302, a grayscale irregularity due to the distance irregularity may be included in the first image 310 projected onto the second project area 302.

According to an embodiment of the disclosure, even when an input image having a same grayscale is input, a grayscale irregularity due to the distance irregularity may be included in the first image 310 projected onto the second project area 302. According to an embodiment of the disclosure, a pixel image of the first image 310 which is displayed on the second project area 302 and corresponds to a farthest area from the image projection unit 110 may be displayed with a lowest grayscale, and pixel images that correspond to areas included in the first surface 210 and the second surface 220 and are close to the image projection unit 110 may be displayed with a high grayscale.

According to an embodiment of the disclosure, the projection area 300 of a case in which the electronic device 100 projects the first image 310 onto the first surface 210 and the second surface 220 may be referred to as a third projection area 303. Here, a distance between the image projection unit 110 and the third projection area 303 may not be regular.

A distance between a partial area included in the third projection area 303 and the image projection unit 110 may be different from a distance between other area included in the third projection area 303 and the image projection unit 110. A distance between the edge 240 of the third projection area 303 and the image projection unit 110 may be greater than a distance between other area included in the third projection area 303 and the image projection unit 110.

In this case, as there is a distance irregularity between the image projection unit 110 and the third projection area 303, a grayscale irregularity due to the distance irregularity may be included in the first image 310 projected onto the third projection area 303.

According to an embodiment of the disclosure, even when an input image having a same grayscale is input, a grayscale irregularity due to the distance irregularity may be included in the first image 310 projected onto the third projection area 303. According to an embodiment of the disclosure, a pixel image of the first image 310 which is displayed on the third projection area 303 and corresponds to the edge 240 may be displayed with a lowest grayscale. A pixel image corresponding to an area of the third projection area 303 may be displayed with a high grayscale, the area being close to the image projection unit 110.

Due to a distance difference between the image projection unit 110 and the projection area 300, the first image 310 having a grayscale different from a grayscale of an obtained input image may be provided to a user. Accordingly, the first image 310 having an irregular grayscale distribution may be provided to the user. Also, the first image 310 having a grayscale different from an input grayscale included in the input image may be provided to the user, such that a user experience of using the electronic device 100 may be interrupted.

According to an embodiment of the disclosure, the electronic device 100 may determine a reference line including information about a point in the projection area 300 which is farthest from the image projection unit 110. According to an embodiment of the disclosure, when the projection area 300 includes two or more surfaces, the reference line may include information about an edge between the two or more surfaces. According to an embodiment of the disclosure, when the projection area 300 includes one surface, a reference line may include information about a point in the one surface which is farthest from the image projection unit 110.

However, the disclosure is not limited thereto, and according to a shape of the electronic device 100 or a position of the image projection unit 110 included in the electronic device 100, a reference line may include information about a point in the projection area 300 which is farthest from the image projection unit 110.

According to an embodiment of the disclosure, the electronic device 100 may obtain a captured image obtained by capturing the first image 310 projected onto the projection area 300. The electronic device 100 may determine a reference line, based on the obtained captured image.

According to an embodiment of the disclosure, the electronic device 100 may obtain distance information about a distance between the image projection unit 110 and the projection area 300. The electronic device 100 may determine the reference line using the obtained distance information.

According to an embodiment of the disclosure, the electronic device 100 may generate a distance correction coefficient for correcting distance differences between the image projection unit 110 and a plurality of areas included in the projection area 300, based on the reference line.

According to an embodiment of the disclosure, the distance correction coefficient may include a plurality of sub-distance correction coefficients.

A sub-distance correction coefficient from among the plurality of sub-distance correction coefficients to correct an input image may be generated to have a large value, the input image being displayed on an area that is distant from the image projection unit 110 and is from among the plurality of areas included in the projection area 300. A sub-distance correction coefficient from among the plurality of sub-distance correction coefficients which is to correct an input image may be generated to have a small value, the input image being displayed on an area that is close to the image projection unit 110 and is from among the plurality of areas included in the projection area 300.

According to an embodiment of the disclosure, the electronic device 100 may provide a user with a corrected image by projecting the corrected image generated by correcting, using a generated distance correction coefficient, an input grayscale of an input image.

According to an embodiment of the disclosure, the corrected image may include a corrected grayscale corrected from the input grayscale using the distance correction coefficient.

According to an embodiment of the disclosure, the electronic device 100 may generate a corrected image including a corrected grayscale generated by correcting an input grayscale of the input image using the plurality of sub-distance correction coefficients. Here, the input image may indicate the first image 310. The corrected image may indicate the second image 320.

According to an embodiment of the disclosure, the electronic device 100 may provide a user with the second image 320 in the projection area 300 which is corrected not to have different grayscales due to a distance difference from the image projection unit 110.

Accordingly, the electronic device 100 of the disclosure may provide the user with the second image 320 having a uniform grayscale, regardless of a shape, a position, a size, etc. of the projection area 300. By doing so, a user experience of the user using the electronic device 100 may be improved.

Effects that are obtainable from the disclosure are not limited to the aforementioned effect, and other unstated effects will be clearly understood by one of ordinary skill in the art in view of the disclosure.

Figure 3:
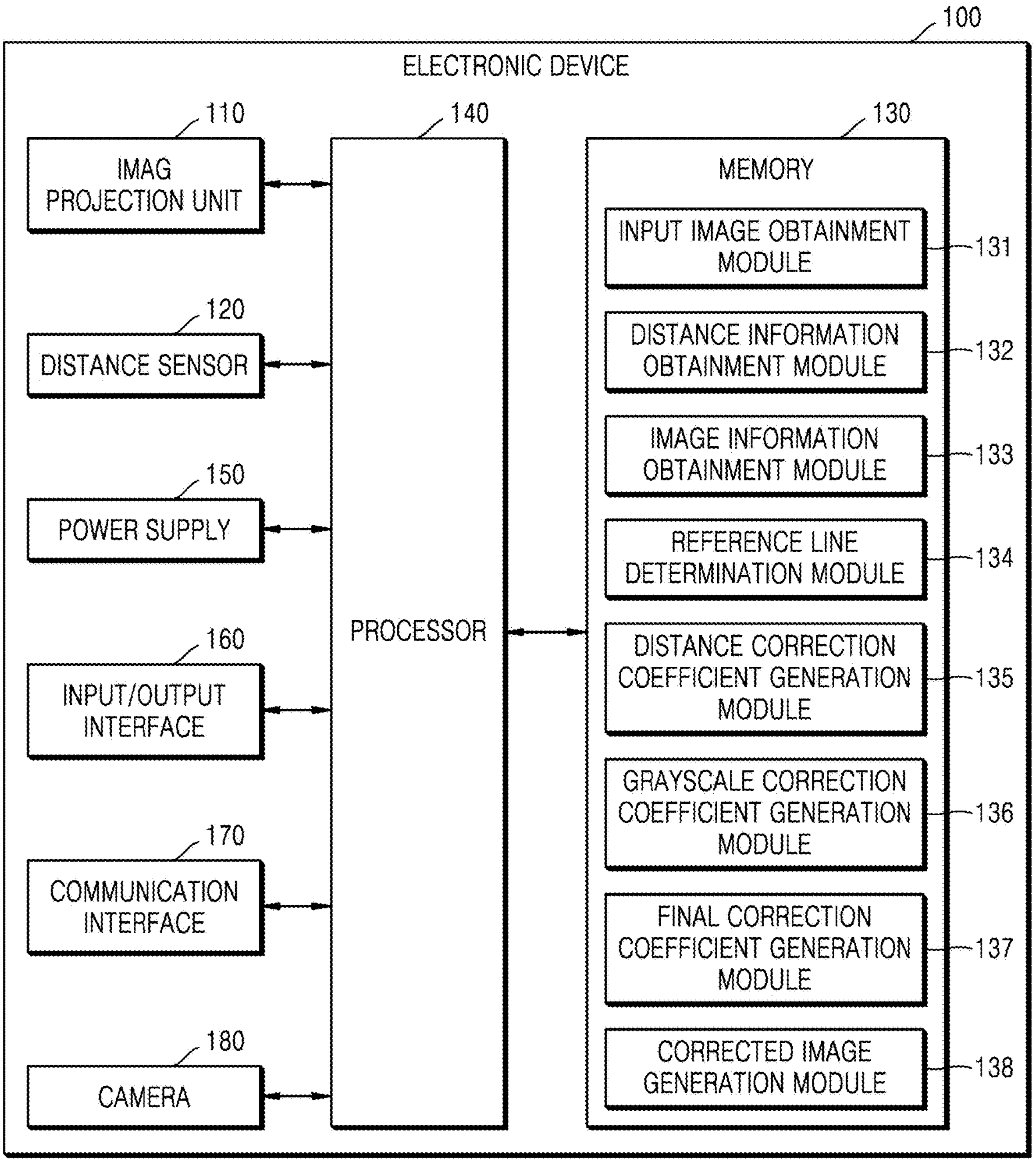
FIG. 3 is a block diagram illustrating an example configuration of an electronic device according to various embodiments.

FIG. 3 is a block diagram for illustrating an example configuration of an electronic device according to various embodiments.

Referring to FIGS. 1 and 3, according to an embodiment of the disclosure, the electronic device 100 may include the image projection unit (e.g., including a projector) 110, a distance sensor 120, memory 130, at least one processor (e.g., including processing circuitry) 140, a power supply 150, an input/output interface (e.g., including various circuitry) 160, a communication interface (e.g., including communication circuitry) 170, and a camera 180. However, not all elements shown in FIG. 3 are necessary elements.

According to an embodiment of the disclosure, the electronic device 100 may be implemented with more elements than the elements shown in FIG. 3 or may be implemented with fewer elements than the shown elements. According to an embodiment of the disclosure, the electronic device 100 may include only one of the distance sensor 120 or the camera 180. The electronic device 100 may not include both the distance sensor 120 and the camera 180.

According to an embodiment of the disclosure, the image projection unit 110, the distance sensor 120, the memory 130, the at least one processor 140, the power supply 150, the input/output interface 160, the communication interface 170, and the camera 180 may be electrically and/or physically connected to each other.

According to an embodiment of the disclosure, the image projection unit 110 may include, for example, a projector and generate light for displaying the image 310 or 320 and may project the image 310 or 320 onto the projection area 300. The image projection unit 110 may also be referred to as a projection unit or a display unit. The image projection unit 110 may include various sub-elements including a light source, a projection lens, a reflector, etc.

According to an embodiment of the disclosure, the image projection unit 110 may project the image 310 or 320 by generating light according to various projection schemes including a cathode-ray tube (CRT) scheme, a liquid crystal display (LCD) scheme, a digital light processing (DLP) scheme, a laser scheme, etc.

According to an embodiment of the disclosure, the image projection unit 110 may include various types of a light source. For example, the image projection unit 110 may include at least one light source among a lamp, a light-emitting diode (LED), and a laser.

According to an embodiment of the disclosure, the image projection unit 110 may output the image 310 or 320 with a 4:3 aspect ratio, a 5:4 aspect ratio, a 16:9 wide aspect ratio, etc. according to the use of the electronic device 100 or user setting. The image projection unit 110 may output the image 310 or 320 with various resolutions including Full high definition (FHD) (1920*1080) or Ultra HD (UHD) (3840*2160), according to a determined aspect ratio, and a resolution of an image output from the image projection unit 110 is not limited thereto.

According to an embodiment of the disclosure, the image projection unit 110 may include a plurality of pixels having various resolutions. The image projection unit 110 may respectively display a plurality of pixel images on the plurality of pixels and may project the image 310 or 320 onto the projection area 300.

According to an embodiment of the disclosure, the distance sensor 120 may measure a distance between the electronic device 100 and the projection area 300 onto which the image 310 or 320 is to be projected. According to an embodiment of the disclosure, the distance sensor 120 may measure a distance between the image projection unit 110 and the projection area 300.

According to an embodiment of the disclosure, the distance sensor 120 may include a depth camera, a Time of Flight (ToF) sensor, a stereo camera, etc. However, the disclosure is not limited thereto, and the distance sensor 120 may include various elements capable of measuring the distance between the image projection unit 110 and the projection area 300.

According to an embodiment of the disclosure, the ToF sensor may include a light source for emitting light, and a light receiver for receiving reflection light that is reflection of the emitted light. According to an embodiment of the disclosure, the ToF sensor may include an infrared LED for emitting infrared light. The ToF sensor may include a detector (for example, a photo diode) capable of receiving infrared light reflected from the projection area 300.

According to an embodiment of the disclosure, the ToF sensor may measure the distance between the image projection unit 110 and the projection area 300, based on a time taken for the emitted light to be reflected and received. However, the disclosure is not limited thereto, and the ToF sensor may include various elements for measuring the distance between the image projection unit 110 and the projection area 300.

According to an embodiment of the disclosure, the depth camera may include a light source for emitting structured light, and a light receiver for receiving light reflected from the projection area 300. According to an embodiment of the disclosure, the light source may include a laser, an LED, etc. The depth camera may measure the distance between the image projection unit 110 and the projection area 300, using reflection (or reflected) light obtained via the light receiver.

According to an embodiment of the disclosure, the stereo camera may measure the distance between the image projection unit 110 and the projection area 300, based on a captured image obtained by photographing the projection area 300 using two or more cameras. According to an embodiment of the disclosure, the stereo camera may measure the distance between the image projection unit 110 and the projection area 300, using a disparity included in the obtained captured image.

However, the disclosure is not limited thereto, and the at least one processor 140 may measure the distance between the image projection unit 110 and the projection area 300, using distance information obtained from the distance sensor 120 by executing a distance information obtainment module 132 to be described in greater detail below.

According to an embodiment of the disclosure, the electronic device 100 may not include the distance sensor 120. The electronic device 100 may obtain, via the input/output interface 160 or the communication interface 170, information about a distance between the image projection unit 110 and the projection area 300 which is measured via an external electronic device including a distance sensor.

According to an embodiment of the disclosure, the memory 130 may have stored therein instructions, a data structure, and program code which are readable by the at least one processor 140. According to an embodiment of the disclosure, the memory 130 may include one or more memories. According to an embodiment of the disclosure, the at least one processor 140 may perform operations by executing instructions or codes of a program stored in the memory 130.

According to an embodiment of the disclosure, the memory 130 may include at least one of a flash memory-type memory, a hard disk-type memory, a multimedia card micro-type memory, a card-type memory (e.g., secure digital (SD) or extreme digital (XD) memory), a random access memory (RAM), a static random access memory (SRAM), a read-only memory (ROM), an electrically erasable programmable read-only memory (EEPROM), a programmable read-only memory (PROM), a mask ROM, flash ROM, a hard disk drive (HDD), or a solid state drive (SSD).

According to an embodiment of the disclosure, the memory 130 may not separately exist but may be configured to be included in the at least one processor 140.

The memory 130 may have stored therein instructions or program code for performing functions or operations of the electronic device 100. The instructions, an algorithm, the data structure, the program code, and an application program which are stored in the memory 130 may be implemented in, for example, programming or scripting languages such as C, C++, Java, assembler, etc.

According to an embodiment of the disclosure, the memory 130 may have stored therein various types of modules which are usable to display the image 310 or 320 on the projection area 300 via the image projection unit 110 so as to provide the image 310 or 320 to a user.

According to an embodiment of the disclosure, the memory 130 may include an input image obtainment module 131, the distance information obtainment module 132, an image information obtainment module 133, a reference line determination module 134, a distance correction coefficient generation module 135, a grayscale correction coefficient generation module 136, a final correction coefficient generation module 137, and a corrected image generation module 138, each of which may include executable program instructions.

However, not all modules shown in FIG. 3 are necessary modules. The memory 130 may include more modules than the modules shown in FIG. 3 or may include fewer modules than the shown modules.

According to an embodiment of the disclosure, a 'module' included in the memory 130 may indicate a unit for processing a function or an operation performed by the at least one processor 140. The 'module' included in the memory 130 may be implemented as software such as instructions, an algorithm, a data structure, or program code.

According to an embodiment of the disclosure, the input image obtainment module 131 may include instructions or program code related to an operation or a function of obtaining an input image for displaying the image 310 or 320 to be displayed via the electronic device 100.

According to an embodiment of the disclosure, the at least one processor 140 may execute the instructions or the program code of the input image obtainment module 131 to obtain the input image for displaying the image 310 or 320 to be displayed via the electronic device 100.

According to an embodiment of the disclosure, the input image may be an image having an input grayscale. The input image may include a plurality of pixel images respectively corresponding to a plurality of pixels. Each of the plurality of pixel images may include a plurality of pixel grayscales.

The input image obtainment module 131 may include instructions or program code related to an operation or a function of obtaining, via the input/output interface 160, an input image via an external electronic device.

The input image obtainment module 131 may include instructions or program code related to an operation or a function of obtaining, via the communication interface 170, an input image via an external server.

According to an embodiment of the disclosure, the at least one processor 140 may execute the instructions or the program code of the input image obtainment module 131 to obtain, via the input/output interface 160, an input image via the external electronic device, or to obtain, via the communication interface 170, an input image via the external server.

According to an embodiment of the disclosure, the distance information obtainment module 132 may include instructions or program code related to an operation or a function of obtaining, via the distance sensor 120, distance information about a distance between the image projection unit 110 and the projection area 300.

According to an embodiment of the disclosure, the at least one processor 140 may execute the instructions or the program code of the distance information obtainment module 132 to obtain, via the distance sensor 120, distance information about a distance between the image projection unit 110 and the projection area 300.

According to an embodiment of the disclosure, the image projection unit 110 may include a plurality of pixels. The projection area 300 may include a plurality of pixel areas respectively corresponding to the plurality of pixels included in the image projection unit 110. The plurality of pixel areas may be areas onto which a plurality of pixel images are respectively displayed on the plurality of pixels.

According to an embodiment of the disclosure, the distance information obtainment module 132 may include instructions or program code related to an operation or a function of obtaining, via the distance sensor 120, a plurality of pieces of pixel distance information about distances between the plurality of pixel areas included in the projection area 300 and the image projection unit 110.

The plurality of pieces of pixel distance information may include distance information about distances between the plurality of pixel areas included in the projection area 300 and the plurality of pixels included in the image projection unit 110 and respectively corresponding to the plurality of pixel areas.

According to an embodiment of the disclosure, the at least one processor 140 may execute the instructions or the program code of the distance information obtainment module 132 to obtain, via the distance sensor 120, the plurality of pieces of pixel distance information about distances between the plurality of pixel areas included in the projection area 300 and the image projection unit 110.

However, the disclosure is not limited thereto, and the at least one processor 140 may execute the instructions or the program code of the distance information obtainment module 132 to obtain, via the input/output interface 160 or the communication interface 170, distance information about a distance between the image projection unit 110 and the projection area 300, the distance information being measured via the external electronic device including the distance sensor.

According to an embodiment of the disclosure, the image information obtainment module 133 may include instructions or program code related to an operation or a function of obtaining, via the camera 180, a captured image obtained by capturing an image projected onto the projection area 300.

The captured image may include information about the projection area 300 and information about the image projected onto the projection area 300. The captured image may include information about a grayscale irregularity in the image projected onto the projection area 300, the grayscale irregularity occurring due to a distance difference between the image projection unit 110 and the projection area 300.

According to an embodiment of the disclosure, the at least one processor 140 may execute the instructions or the program code of the image information obtainment module 133 to obtain, via the camera 180, the captured image obtained by capturing the image projected onto the projection area 300.

However, the disclosure is not limited thereto, and the at least one processor 140 may execute the instructions or the program code of the image information obtainment module 133 to obtain, via the input/output interface 160 or the communication interface 170, the captured image obtained by capturing the image projected onto the projection area 300 via an external electronic device including a camera.

According to an embodiment of the disclosure, the reference line determination module 134 may include instructions or program code related to an operation or a function of determining, based on the obtained distance information, a reference line including information about a point in the projection area 300 which is farthest from the image projection unit 110.

According to an embodiment of the disclosure, the at least one processor 140 may execute the instructions or the program code of the reference line determination module 134 to determine, based on the obtained distance information, the reference line including information about the point in the projection area 300 which is farthest from the image projection unit 110.

While the distance information obtainment module 132 and the image information obtainment module 133 are illustrated as separate modules, the disclosure is not limited thereto. According to an embodiment of the disclosure, an operation performed via the distance information obtainment module 132 and an operation performed via the image information obtainment module 133 may be performed via one module.

According to an embodiment of the disclosure, the distance information obtainment module 132 may include instructions or program code related to an operation or a function of obtaining distance information about a distance between the image projection unit 110 and the projection area 300 via the distance sensor 120, and determining a reference line using the obtained distance information.

According to an embodiment of the disclosure, the reference line determination module 134 may include instructions or program code related to an operation or a function of determining, based on the obtained captured image, a reference line including information about a point in the projection area 300 which is farthest from the image projection unit 110.

According to an embodiment of the disclosure, the at least one processor 140 may execute the instructions or the program code of the reference line determination module 134 to determine, based on the obtained captured image, the reference line including information about the point in the projection area 300 which is farthest from the image projection unit 110.

While the image information obtainment module 133 and the reference line determination module 134 are illustrated as separate modules, the disclosure is not limited thereto. According to an embodiment of the disclosure, an operation performed via the image information obtainment module 133 and an operation performed via the reference line determination module 134 may be performed via one module.

According to an embodiment of the disclosure, the image information obtainment module 133 may include instructions or program code related to an operation or a function of obtaining, via the camera 180, a captured image obtained by capturing an image projected onto the projection area 300, and determining a reference line using the obtained captured image.

According to an embodiment of the disclosure, the reference line and an operation of determining the reference line will be described in greater detail below with reference to FIGS. 9 and 10. According to an embodiment of the disclosure, the distance correction coefficient generation module 135 may include instructions or program code related to an operation or a function of generating a distance correction coefficient for compensating an input grayscale of an input image, based on a reference line. The distance correction coefficient generation module 135 may include instructions or program code related to an operation or a function of generating a distance correction coefficient so as to increase a size of the distance correction coefficient when a distance between the image projection unit 110 and a reference line increases.

According to an embodiment of the disclosure, the at least one processor 140 may execute the instructions or the program code of the distance correction coefficient generation module 135 to generate a distance correction coefficient for compensating an input grayscale of an input image, based on a determined reference line.

According to an embodiment of the disclosure, as an input image includes a plurality of pixel images, the distance correction coefficient may include a plurality of sub-distance correction coefficients for respectively correcting a plurality of pixel grayscales of the plurality of pixel images.

According to an embodiment of the disclosure, the distance correction coefficient generation module 135 may include instructions or program code related to an operation or a function of generating a plurality of sub-distance correction coefficients so as to increase respective sizes of the plurality of sub-distance correction coefficients when distance between each of a plurality of pixel areas and the reference line decrease.

According to an embodiment of the disclosure, the at least one processor 140 may execute the instructions or the program code of the distance correction coefficient generation module 135 to generate the plurality of sub-distance correction coefficients for respectively correcting the plurality of pixel grayscales of the plurality of pixel images.

According to an embodiment of the disclosure, the grayscale correction coefficient generation module 136 may include instructions or program code related to an operation or a function of generating a grayscale correction coefficient for correcting an input image so as to increase an input grayscale of the input image, based on the obtained input image. The grayscale correction coefficient generation module 136 may generate the grayscale correction coefficient so as to increase the grayscale correction coefficient when the input grayscale of the input image decreases.

According to an embodiment of the disclosure, the at least one processor 140 may execute the instructions or the program code of the grayscale correction coefficient generation module 136 to generate the grayscale correction coefficient for correcting the input image so as to increase the input grayscale of the input image, based on the obtained input image.

According to an embodiment of the disclosure, as an input image includes a plurality of pixel images, the grayscale correction coefficient may include a plurality of sub-grayscale correction coefficients for respectively correcting a plurality of pixel grayscales of the plurality of pixel images.

According to an embodiment of the disclosure, a size of a sub-grayscale correction coefficient among the plurality of sub-grayscale correction coefficients which corresponds to a pixel image having a small pixel grayscale may be greater than a size of a sub-grayscale correction coefficient which corresponds to a pixel image having a large pixel grayscale.

According to an embodiment of the disclosure, the grayscale correction coefficient generation module 136 may include instructions or program code related to an operation or a function of generating a plurality of sub-distance correction coefficients having a size being inversely proportional to a size of a plurality of pixel grayscales of a plurality of pixel images.

According to an embodiment of the disclosure, the at least one processor 140 may execute the instructions or the program code of the grayscale correction coefficient generation module 136 to generate the plurality of sub-grayscale correction coefficients for respectively correcting the plurality of pixel grayscales of the plurality of pixel images.

Hereinafter, the grayscale correction coefficient and an operation of generating the grayscale correction coefficient will be described in greater detail below with reference to FIGS. 13, 14 and 15.

According to an embodiment of the disclosure, the final correction coefficient generation module 137 may include instructions or program code related to an operation or a function of generating a final correction coefficient, based on a distance correction coefficient and a grayscale correction coefficient. The final correction coefficient generation module 137 may include the instructions or the program code related to the operation or the function of generating the final correction coefficient by multiplying the distance correction coefficient by the grayscale correction coefficient.

The final correction coefficient may be a coefficient used for correcting an input grayscale of an input image to a corrected grayscale.

According to an embodiment of the disclosure, the at least one processor 140 may execute the instructions or the program code of the final correction coefficient generation module 137 to generate the final correction coefficient by multiplying the distance correction coefficient by the grayscale correction coefficient.

Hereinafter, the final correction coefficient and an operation of generating the final correction coefficient will be described in greater detail below with reference to FIG. 16.

According to an embodiment of the disclosure, the corrected image generation module 138 may include instructions or program code related to an operation or a function of generating a corrected image including a corrected grayscale generated by multiplying an input grayscale of an input image by a distance correction coefficient. The corrected image generation module 138 may include instructions or program code related to an operation or a function of generating a corrected image including a corrected grayscale generated by multiplying an input grayscale of an input image by a final correction coefficient.

According to an embodiment of the disclosure, the at least one processor 140 may execute the instructions or the program code of the corrected image generation module 138 to generate the corrected image including the corrected grayscale generated by multiplying the input grayscale of the input image by the distance correction coefficient.

Hereinafter, the final correction coefficient and an operation of generating the final correction coefficient will be described in greater detail below.

According to an embodiment of the disclosure, the memory 130 may further include a corrected image display module (not shown) for controlling the image projection unit 110 to display a generated corrected image. The corrected image display module may include instructions or program code related to an operation or a function of controlling the image projection unit 110 to display the generated corrected image. The at least one processor 140 may execute the instructions or the program code of the corrected image display module to control the image projection unit 110 to display the generated corrected image.

According to an embodiment of the disclosure, the at least one processor 140 is a configuration for controlling a series of processes for causing the electronic device 100 to operate according to embodiments to be described below, and may include one or more processors.

According to an embodiment of the disclosure, the at least one processor 140 may include various processing circuitry and be configured as at least one of a central processing unit, a microprocessor, a graphics processing unit, an application processor (AP), application specific integrated circuits (ASICs), digital signal processors (DSPs), digital signal processing devices (DSPDs), programmable logic devices (PLDs), field programmable gate arrays (FPGAs), a communication processor (CP), a neural processing unit, or an artificial intelligence (AI)-dedicated processor having a hardware structure specialized for training and processing of an AI model, but the disclosure is not limited thereto. The at least one processor 140 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment of the disclosure, when the one or more processors included in the at least one processor 140 are each an AI-dedicated processor, the AI-dedicated processor may be designed to have a hardware structure specialized for processing a particular AI model.

According to an embodiment of the disclosure, the at least one processor 140 may be configured as circuitry such as a system on chip (SoC) or an integrated circuit (IC).

According to an embodiment of the disclosure, the at least one processor 140 may execute various types of modules stored in the memory 130. The at least one processor 140 may execute one or more instructions configuring the various types of modules stored in the memory 130. The at least one processor 140 may execute a program or the one or more instructions stored in the memory 130 to process data according to a predefined operation rule or an AI model.

According to an embodiment of the disclosure, the at least one processor 140 may execute at least one module among the input image obtainment module 131, the distance information obtainment module 132, the image information obtainment module 133, the reference line determination module 134, the distance correction coefficient generation module 135, the grayscale correction coefficient generation module 136, the final correction coefficient generation module 137, or the corrected image generation module 138, which is stored in the memory 130.

According to an embodiment of the disclosure, the at least one processor 140 may include a plurality of processors.

According to an embodiment of the disclosure, at least one module among the input image obtainment module 131, the distance information obtainment module 132, the image information obtainment module 133, the reference line determination module 134, the distance correction coefficient generation module 135, the grayscale correction coefficient generation module 136, the final correction coefficient generation module 137, or the corrected image generation module 138, which is stored in the memory 130, may be executed by any processor among the plurality of processors.

Various other modules among the input image obtainment module 131, the distance information obtainment module 132, the image information obtainment module 133, the reference line determination module 134, the distance correction coefficient generation module 135, the grayscale correction coefficient generation module 136, the final correction coefficient generation module 137, or the corrected image generation module 138, which is stored in the memory 130, may be executed by another processor among the plurality of processors.

According to an embodiment of the disclosure, the power supply 150 may supply power to the electronic device 100 under the control of the at least one processor 140. According to an embodiment of the disclosure, the power supply 150 may be connected to an external power device, and may deliver power to the electronic device 100 by receiving the power from the external power device.

According to an embodiment of the disclosure, the power supply 150 may be charged by receiving power from the external power device, and may deliver the charged power to the electronic device 100. According to an embodiment of the disclosure, the power supply 150 may deliver pre-charged power to the electronic device 100 even when the power supply 150 is not connected to the external power device. According to an embodiment of the disclosure, the power supply 150 may include a battery.

According to an embodiment of the disclosure, the input/output interface 160 may include various input/output circuitry and be provided at least one of image data or audio data from an external electronic device, under the control of the at least one processor 140. The at least one processor 140 may obtain an input image from the external electronic device via the input/output interface 160.

According to an embodiment of the disclosure, the input/output interface 160 may perform an input or output operation with the external electronic device using at least one of input/output schemes including a high-definition multimedia interface (HDMI) port, a digital visual interface (DVI), a component jack, a personal computer (PC) port, or a universal serial bus (USB) port. However, the disclosure is not limited thereto.

According to an embodiment of the disclosure, the communication interface 170 may include various communication circuitry and perform data communication with an external server or the external electronic device, under the control of the at least one processor 140. The communication interface 170 may perform data communication with the external server or the external electronic device using at least one of data communication schemes including wired local area network (LAN), wireless LAN, Wi-Fi, Bluetooth, ZigBee, Wi-Fi direct (WFD), infrared data association (IrDA), Bluetooth low energy (BLE), Near Field Communication (NFC), wireless broadband Internet (WiBro), World interoperability for microwave access (WiMAX), shared wireless access protocol (SWAP), wireless gigabit alliance (WiGig), and radio frequency (RF) communication.

According to an embodiment of the disclosure, the at least one processor 140 may receive an input image from the external server or the external electronic device via the communication interface 170. The at least one processor 140 may receive distance information about a distance between the image projection unit 110 and the projection area 300 from the external server or the external electronic device via the communication interface 170.

According to an embodiment of the disclosure, the camera 180 may include an RGB camera capable of obtaining an image including RGB information. According to an embodiment of the disclosure, the camera 180 may obtain a captured image by capturing the projection area 300. However, the disclosure is not limited thereto, and the camera 180 may include a RGB-depth camera for obtaining an image including RGB information and depth information by photographing the projection area 300.

FIG. 3 illustrates the distance sensor 120 and the camera 180 as separate elements, but the disclosure is not limited thereto. According to an embodiment of the disclosure, the electronic device 100 may, via the same elements, obtain a captured image obtained by photographing the projection area 300 or measure a distance between the image projection unit 110 and the projection area 300.

Figure 4:
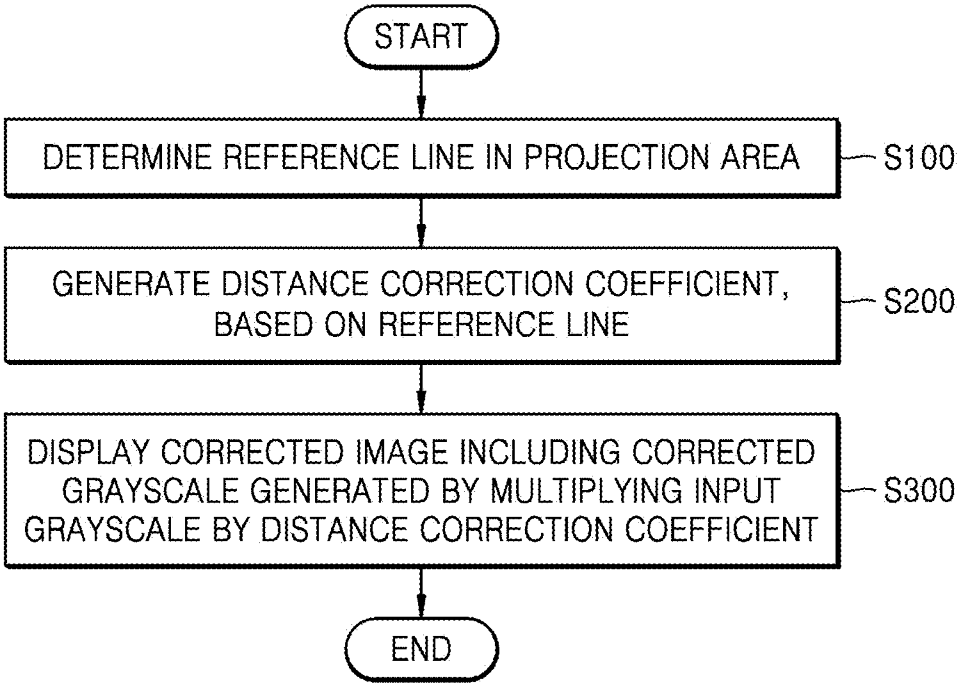
FIG. 4 is a flowchart illustrating example operations of an electronic device, according to various embodiments.

FIG. 4 is a flowchart illustrating example operations of an electronic device, according to various embodiments.

Referring to FIGS. 1, 3, and 4, according to an embodiment of the disclosure, an operating method of the electronic device 100 may include operation S100 of determining a reference line including information about a point in the projection area 300 onto which the image 310 is projected, the point being farthest from the image projection unit 110.

According to an embodiment of the disclosure, in operation S100 of determining a reference line, the electronic device 100 may determine the reference line including the information about the point in the projection area 300 onto which the image 310 is projected, the point being farthest from the image projection unit 110.

According to an embodiment of the disclosure, the operating method of the electronic device 100 may include operation S200 of generating a distance correction coefficient for correcting an input grayscale of an input image, based on the determined reference line.

According to an embodiment of the disclosure, in operation S200 of generating a distance correction coefficient, the electronic device 100 may generate the distance correction coefficient for correcting the input grayscale of the input image, based on the reference line.

Hereinafter, the distance correction coefficient and an operation of generating the distance correction coefficient will be described in greater detail below with reference to FIGS. 6, 7 and 8.

According to an embodiment of the disclosure, the operating method of the electronic device 100 may include operation S300 of displaying a corrected image including a corrected grayscale generated by multiplying the input grayscale by the distance correction coefficient.

According to an embodiment of the disclosure, in operation S300 of displaying the corrected image including the corrected grayscale, the electronic device 100 may control the image projection unit 110 to display the corrected image including the corrected grayscale generated by multiplying the input grayscale by the distance correction coefficient.

According to an embodiment of the disclosure, in operation S300 of displaying, via the image projection unit 110, the corrected image including the corrected grayscale, it is shown that an operation of generating the corrected image including the corrected grayscale and an operation of controlling the image projection unit 110 to display the generated corrected image are performed in one operation, but the disclosure is not limited thereto.

According to an embodiment of the disclosure, the operation of the electronic device 100 may be divided into operation of generating the corrected image including the corrected grayscale generated by multiplying the input grayscale by the distance correction coefficient, and operation of displaying the generated corrected image via the image projection unit 110.

Figure 5:
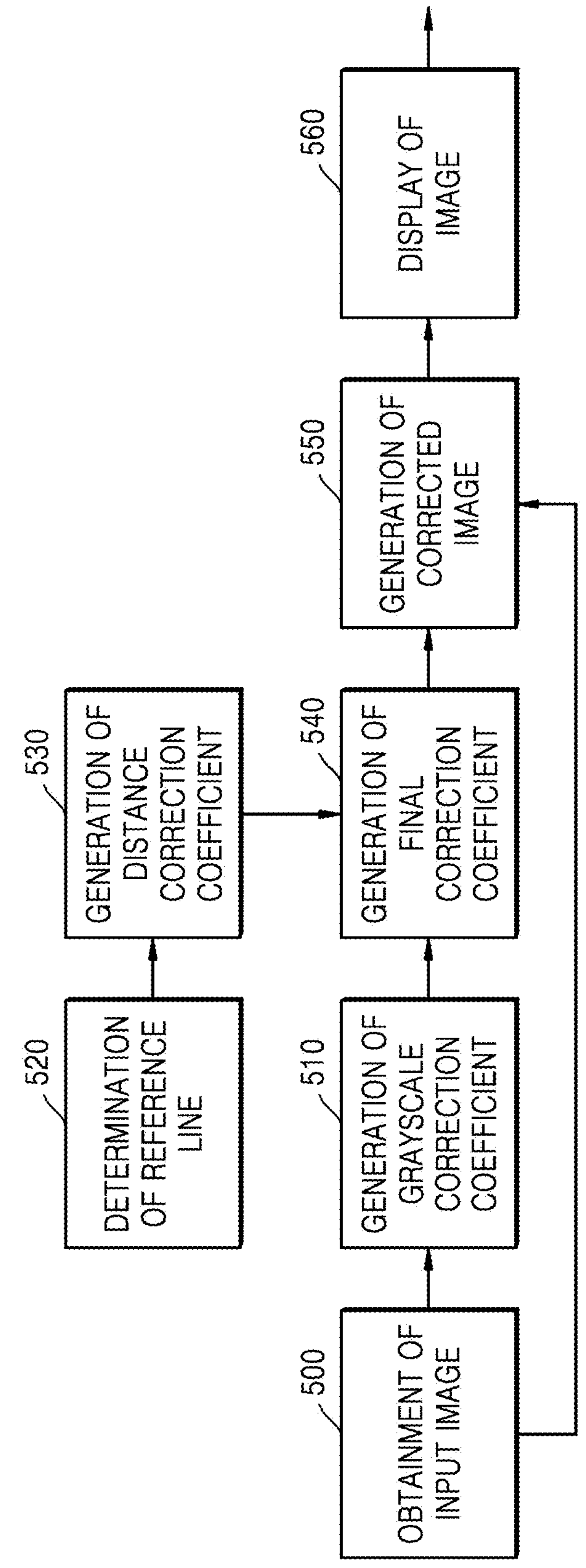
FIG. 5 is a diagram illustrating example operations of an electronic device, according to various embodiments.

FIG. 5 is a diagram illustrating example operations of an electronic device, according to various embodiments.

Referring to FIGS. 1, 3, 4, and 5, in an embodiment of the disclosure, FIG. 5 illustrates a plurality of operations performed by the electronic device 100.

According to an embodiment of the disclosure, in operation 500, the at least one processor 140 may obtain an input image having an input grayscale, using the input image obtainment module 131. The at least one processor 140 may obtain the input image from an external electronic device or an external server via the input/output interface 160 or the communication interface 170.

According to an embodiment of the disclosure, in operation 510, the at least one processor 140 may generate a grayscale correction coefficient for correcting an input grayscale of the obtained input image, using, for example, the grayscale correction coefficient generation module 136. The grayscale correction coefficient may be a correction coefficient so as to increase the input grayscale of the input image.

According to an embodiment of the disclosure, in operation 520, the at least one processor 140 may determine, using, for example, the reference line determination module 134, a reference line including information about a point in the projection area 300 onto which the image 310 is projected, the point being farthest from the image projection unit 110. The at least one processor 140 may determine the reference line, based on distance information about a distance between the image projection unit 110 and the projection area 300, the distance information being obtained via the distance sensor 120, or photographing information obtained by capturing an image projected onto the projection area 300, the image being obtained via the camera 180. However, the disclosure is not limited thereto, and the at least one processor 140 may determine the reference line, based on distance information or photographing information received from the external electronic device.

According to an embodiment of the disclosure, in operation 530, the at least one processor 140 may generate, using, for example, the distance correction coefficient generation module 135, a distance correction coefficient for correcting the input grayscale of the input image, based on the determined reference line.

The at least one processor 140 may generate, in operation 530, the distance correction coefficient using, for example, the distance correction coefficient generation module 135.

According to an embodiment of the disclosure, the distance correction coefficient may be a correction coefficient for correcting the input grayscale of the input image by reflecting a distance between the image projection unit 110 and the projection area 300, so as to resolve a grayscale irregularity in the image 310 due to an irregular distance between the image projection unit 110 and the projection area 300.

According to an embodiment of the disclosure, in operation 540, the at least one processor 140 may generate a final correction coefficient using, for example, the final correction coefficient generation module 137. The at least one processor 140 may generate the final correction coefficient by multiplying the grayscale correction coefficient by the distance correction coefficient.

According to an embodiment of the disclosure, in operation 550, the at least one processor 140 may generate a corrected image using, for example, the corrected image generation module 138. The at least one processor 140 may generate the corrected image including a corrected coefficient generated by multiplying the input grayscale of the input image by the final correction coefficient.

According to an embodiment of the disclosure, in operation 560, the at least one processor 140 may control the image projection unit 110 to display the generated corrected image.

In FIG. 5, operations 500 to 560 are illustrated using arrows, according an operation flow, but the disclosure is not limited thereto. An order of performing operations 500 to 560 may vary. Any one of operations 500 to 560 may be skipped or one or more operations may be added thereto. Also, two or more operations of operations 500 to 560 may be performed as one operation.

Figure 6:
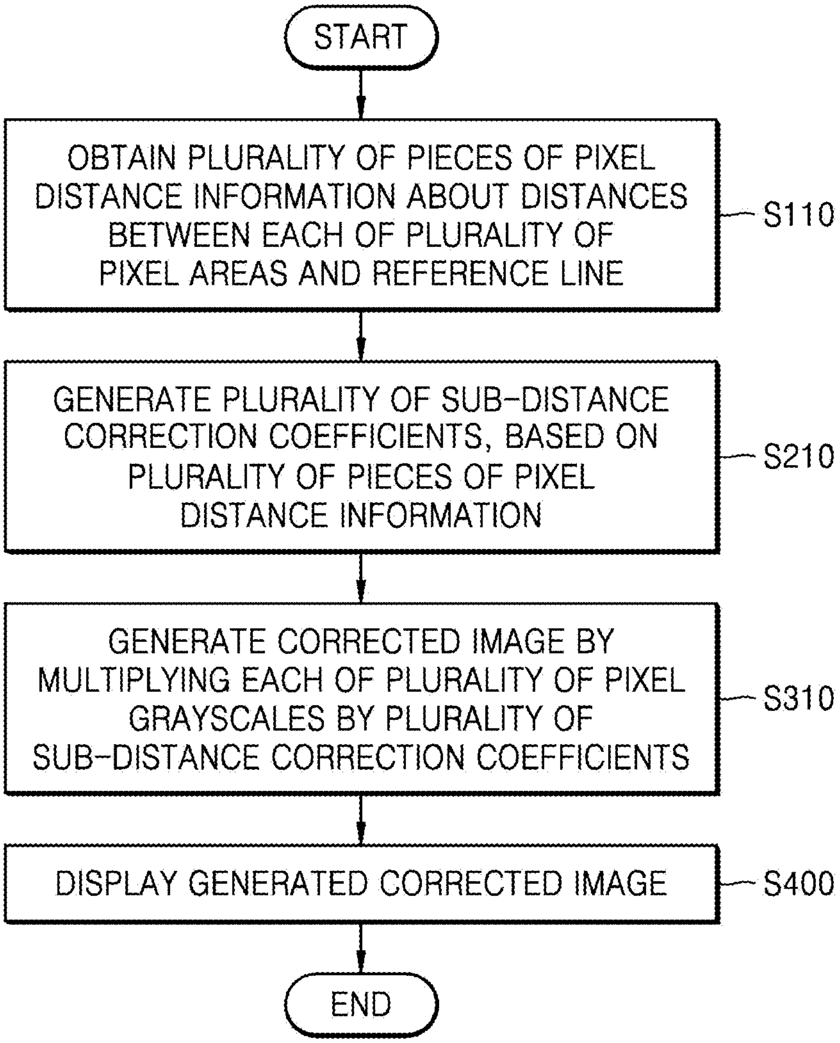
FIG. 6 is a flowchart illustrating an example operation of generating a corrected image according to a distance between each of a plurality of pixel areas and a reference line, according to various embodiments.

FIG. 6 is a flowchart illustrating an example operation of generating a corrected image according to a distance between each of a plurality of pixel areas and a reference line, according to various embodiments. FIG. 7 is a diagram illustrating an example of the operation of generating a corrected image according to a distance between each of a plurality of pixel areas and a reference line, according to various embodiments.

Referring to FIGS. 1, 3, 6, and 7, in an embodiment of the disclosure, an image projection unit 700 may include a plurality of pixels 701 and 702.

Figure 7:
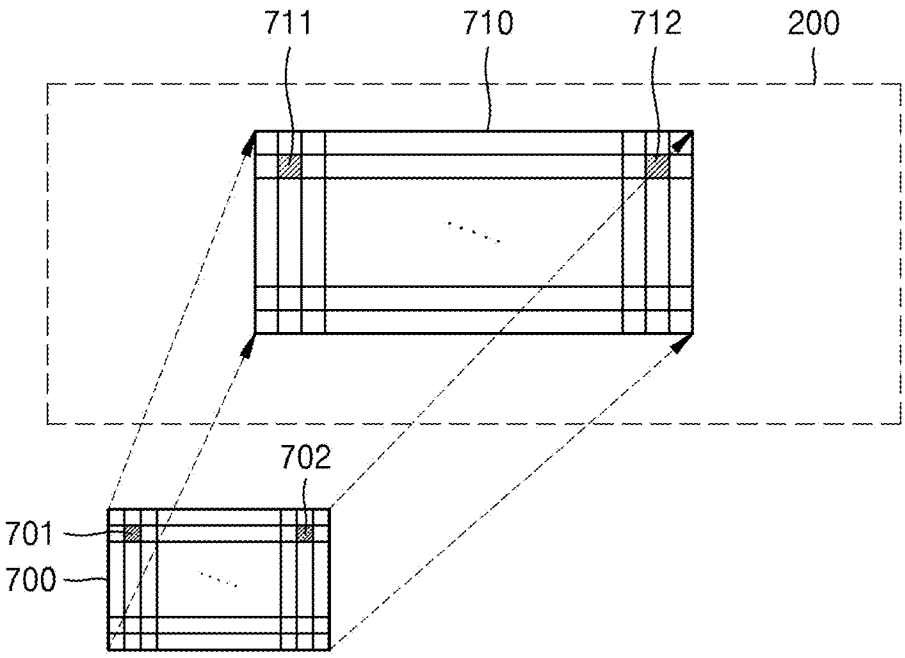
FIG. 7 is a diagram illustrating an example operation of generating a corrected image according to a distance between each of a plurality of pixel areas and a reference line, according to various embodiments.

While FIG. 7 illustrates the image projection unit 700 with a square shape, the disclosure is not limited thereto. The image projection unit 700 may have various shapes including a round shape.

According to an embodiment of the disclosure, an input image may include a plurality of pixel images respectively corresponding to the plurality of pixels 701 and 702. The plurality of pixel images may be respectively displayed on the plurality of pixels 701 and 702.

A projection area 710 included in a space 200 may include a plurality of pixel areas 711 and 712 respectively corresponding to the plurality of pixels 701 and 702. The projection area 710 is an area onto which an image displayed on the image projection unit 700 is projected, and the plurality of pixel images displayed on the image projection unit 700 may be enlarged in a projection process and displayed on the projection area 710.

According to an embodiment of the disclosure, the plurality of pixels 701 and 702 may include the first pixel 701 and the second pixel 702. The plurality of pixel areas 711 and 712 may include the first pixel area 711 and the second pixel area 712. The first pixel area 711 may be an area which corresponds to the first pixel 701 and onto which a pixel image displayed on the first pixel 701 is projected. The second pixel area 712 may be an area which corresponds to the second pixel 702 and onto which a pixel image displayed on the second pixel 702 is projected.

According to an embodiment of the disclosure, the operating method of the electronic device 100 may include operation S110 of obtaining a plurality of pieces of pixel distance information about distances between each of the plurality of pixel areas 711 and 712 and a reference line.

According to an embodiment of the disclosure, in operation S110 of obtaining a plurality of pieces of pixel distance information, the electronic device 100 may obtain the plurality of pieces of pixel distance information about the distances between each of the plurality of pixel areas 711 and 712 and the reference line.

According to an embodiment of the disclosure, a plurality of pieces of distance information about distances between the respective pixel areas 711 and 712 and the reference line may be referred to as the plurality of pieces of pixel distance information. The plurality of pieces of pixel distance information may be obtained by calculating distances between the respective pixel areas 711 and 712 and a point in the projection area 710 included in the reference line, the point being farthest from the image projection unit 700.

According to an embodiment of the disclosure, distances included in the plurality of pieces of pixel distance information may have different lengths. A first distance between the reference line and the first pixel area 711 may be different from a second distance between the reference line and the second pixel area 712. The first distance between the reference line and the first pixel area 711 may be greater than the second distance between the reference line and the second pixel area 712.

FIG. 7 illustrates a case in which the image projection unit 700 projects an image slantly onto at least one surface on the space 200. However, the disclosure is not limited thereto, and the image projection unit 700 may project an image onto at least two surfaces on the space 200. In this case, distances between respective pixel regions and a reference line may be different from each other. Accordingly, the plurality of pieces of pixel distance information may have distances with different sizes.

According to an embodiment of the disclosure, the at least one processor 140 may execute instructions or program code of the distance correction coefficient generation module 135 to obtain the plurality of pieces of pixel distance information by calculating the distance between each of the plurality of pixel areas 711 and 712 and the reference line.

According to an embodiment of the disclosure, the operating method of the electronic device 100 may include operation S210 of generating a plurality of sub-distance correction coefficients, based on the obtained plurality of pieces of pixel distance information.

According to an embodiment of the disclosure, a plurality of pixel images of an input image may each include a pixel grayscale. According to an embodiment of the disclosure, a distance correction coefficient may include the plurality of sub-distance correction coefficients for respectively correcting a plurality of pixel grayscales of the plurality of pixel images.

According to an embodiment of the disclosure, in operation S210 of generating a plurality of sub-distance correction coefficients, based on the obtained plurality of pieces of pixel distance information, the plurality of sub-distance correction coefficients respectively corresponding to a plurality of pixel areas may be generated, according to distances between the respective pixel areas and a reference line. The plurality of sub-distance correction coefficients may be generated in such a manner that the respective sub-distance correction coefficients increase when the distances between the respective pixel areas and the reference line decrease.

According to an embodiment of the disclosure, when a length of the second distance is shorter than a length of the first distance, a first sub-distance correction coefficient and a second sub-distance correction coefficient may be generated in such a manner that a size of the second sub-distance correction coefficient corresponding to a second pixel area is greater than a size of the first sub-distance correction coefficient corresponding to a first pixel area.

According to an embodiment of the disclosure, in operation S210 of generating a plurality of sub-distance correction coefficients, the electronic device 100 may generate the plurality of sub-distance correction coefficients respectively corresponding to a plurality of pixel areas 710 and 720, according to distances between the respective pixel areas 711 and 712 and the reference line, based on the obtained plurality of pieces of pixel distance information.

The at least one processor 140 may execute instructions or program code of the distance correction coefficient generation module 135 to generate the plurality of sub-distance correction coefficients respectively corresponding to the plurality of pixel areas 710 and 720, according to the distances between the respective pixel areas 711 and 712 and the reference line, based on the obtained plurality of pieces of pixel distance information.

The at least one processor 140 may generate the plurality of sub-distance correction coefficients in such a manner that the respective sub-distance correction coefficients corresponding to the plurality of pixel areas 710 and 720 increase when the distances between the respective pixel areas 711 and 712 and the reference line decrease.

According to an embodiment of the disclosure, the distances between the respective pixel areas 711 and 712 and the reference line may correspond to distances between the respective pixel areas 711 and 712 and the image projection unit 700.

According to an embodiment of the disclosure, the reference line may include information about a point in the projection area 710 which is farthest from the image projection unit 700. Therefore, that one pixel area among the plurality of pixel areas 711 and 712 is close to the reference line may indicate that a distance between the one pixel area and the image projection unit 700 is remote. That other one pixel area among the plurality of pixel areas 711 and 712 is remote from the reference line may indicate that a distance between the other one pixel area and the image projection unit 700 is close.

According to an embodiment of the disclosure, the operating method of the electronic device 100 may include operation S310 of generating a corrected image including a plurality of sub-corrected grayscales generated by multiplying each of a plurality of pixel grayscales by the plurality of sub-distance correction coefficients.

According to an embodiment of the disclosure, in operation S310 of generating a corrected image, the electronic device 100 may generate the corrected image by multiplying each of the plurality of pixel grayscales of the plurality of pixel images by the plurality of sub-distance correction coefficients. The corrected image may include the plurality of sub-corrected grayscales generated by multiplying each of the plurality of pixel grayscales by the plurality of sub-distance correction coefficients. In this regard, each of the plurality of sub-corrected grayscales may be greater than each of the plurality of pixel grayscales.

According to an embodiment of the disclosure, in operation S310 of generating a corrected image, the at least one processor 140 may execute instructions or program code of the corrected image generation module 138 to generate the corrected image including the plurality of sub-corrected grayscales generated by multiplying each of the plurality of pixel grayscales by the plurality of sub-distance correction coefficients.

According to an embodiment of the disclosure, the operating method of the electronic device 100 may include operation S400 of displaying the generated corrected image, via the image projection unit 110.

According to an embodiment of the disclosure, in operation S400 of displaying the generated corrected image, the electronic device 100 may display the corrected image via the image projection unit 110. The at least one processor 140 may control the image projection unit 110 to display the corrected image.

However, the disclosure is not limited thereto, and operation S310 of generating a corrected image and operation S400 of displaying the corrected image may be performed in one operation.

Figure 8:
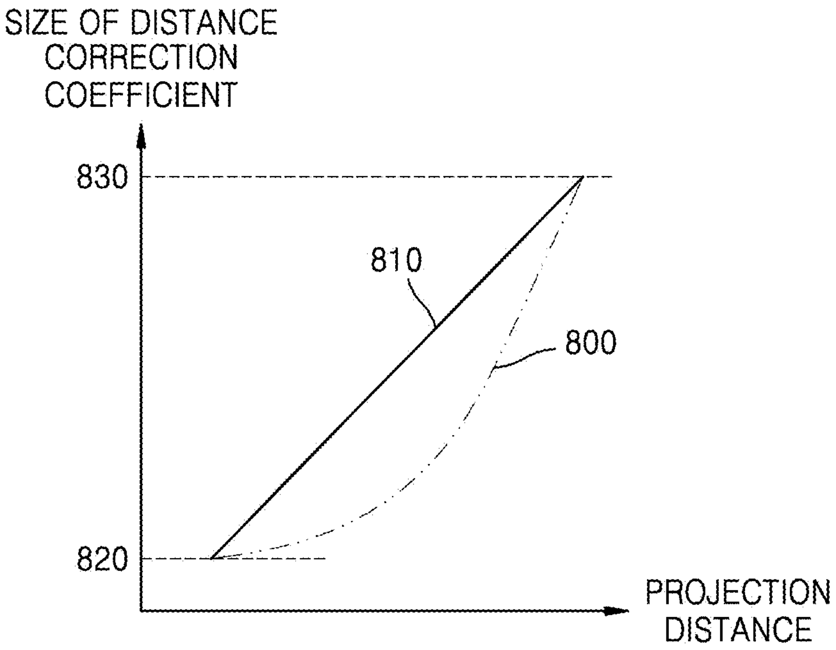
FIG. 8 is a graph illustrating a variation in a size of a distance correction coefficient according to a distance between an image projection unit and a projection area, according to various embodiments.

FIG. 8 is a graph illustrating variation in a size of a distance correction coefficient according to a distance between an image projection unit and a projection area, according to various embodiments.

Referring to FIGS. 7 and 8, in an embodiment of the disclosure, FIG. 8 illustrates a first graph 800 and a second graph 810 indicating a "projection distance" between the image projection unit 700 and the projection area 710 and a "distance correction coefficient". Here, an X-axis may be a distance axis, and a unit may be a meter. A Y-axis may be a size axis, and a unit may be a positive number. However, the disclosure is not limited thereto, and the units of the X-axis and the Y-axis may be changed when necessary.

According to an embodiment of the disclosure, referring to the first graph 800, the more the projection distance increases, the more the size of the distance correction coefficient may increase. The first graph 800 may have a quadric shape. The first graph 800 may be a graph indicating the first relation to be described below.

According to an embodiment of the disclosure, referring to the second graph 810, the more the projection distance increases, the more the size of the distance correction coefficient may increase. In this regard, the projection distance may be proportional to the size of the distance correction coefficient. The second graph 810 may have a linear functional shape. The second graph 810 may be a graph indicating the second relation to be described below.

According to an embodiment of the disclosure, the size of the distance correction coefficient may have a first threshold value 820 and a second threshold value 830.

According to an embodiment of the disclosure, the first threshold value 820 may be a value preset to be greater than 0. Even when the projection distance decreases, the distance correction coefficient may have a size equal to or greater than the first threshold value 820. By doing so, even when the projection distance decreases, it is possible to prevent and/or reduce the likelihood that a corrected grayscale from having a value close to 0.

According to an embodiment of the disclosure, the second threshold value 830 may be a value preset based on an input grayscale of an input image. When generating the corrected grayscale by multiplying the input grayscale by the distance correction coefficient, in a case where a value obtained by multiplying the input grayscale by the distance correction coefficient is greater than a maximum value of the corrected grayscale which the image projection unit 700 can display, a phenomenon in which grayscales are saturated at the maximum value of the corrected grayscale in a corrected image may occur. Therefore, the second threshold value 830 may be determined based on the maximum value of the corrected grayscale which the image projection unit 700 can display and a maximum value of the input grayscale included in the input image.

However, the disclosure is not limited thereto. According to an embodiment of the disclosure, the corrected grayscale may be set to be corrected to be greater than the input grayscale, by setting the first threshold value 820 to 1.

According to an embodiment of the disclosure, in operation S200 of generating a distance correction coefficient in FIG. 4, the distance correction coefficient may be generated using one of the first graph 800 or the second graph 810.

In operation S210 of generating a plurality of sub-distance correction coefficients of FIG. 6, the plurality of sub-distance correction coefficients may be generated based on a plurality of pieces of pixel distance information using one of the first graph 800 or the second graph 810.

According to an embodiment of the disclosure, the projection distance may be calculated via a distance between a reference line and the image projection unit 710. That the distance between the reference line and the image projection unit 710 increases may may refer, for example, to the projection distance decreasing. That the distance between the reference line and the image projection unit 710 decreases may refer, for example, to the projection distance increasing.

According to an embodiment of the disclosure, the electronic device 100 may generate the distance correction coefficient based on the reference line, using one of the first graph 800 or the second graph 810. In this case, the electronic device 100 may generate the distance correction coefficient by determining that the distance between the reference line and the image projection unit 710 decreases when the projection distance increases.

Figure 9:
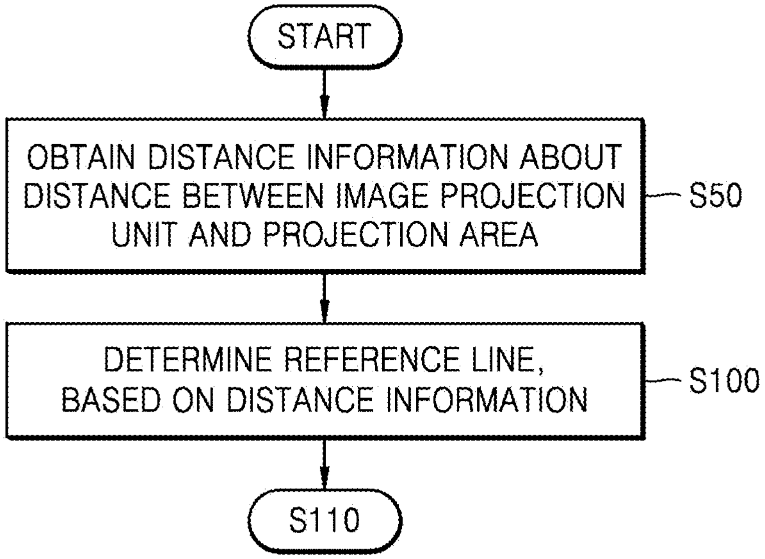
FIG. 9 is a flowchart illustrating an example operation of determining a reference line, and generating a corrected image using the reference line, according to various embodiments.

FIG. 9 is a flowchart illustrating an example operation of determining a reference line, and generating a corrected image using the reference line, according to various embodiments. FIG. 10 is a diagram illustrating an example operation of determining a reference line in a projection area, according to various embodiments. Hereinafter, same operations as operations described with reference to FIG. 4 are applied the same reference numerals, and redundant descriptions thereof may not be repeated here.

Referring to FIGS. 1, 3, 4, 7, and 9, in an embodiment of the disclosure, the operating method of the electronic device 100 may include operation S50 of obtaining distance information about a distance between the image projection unit 700 and the projection area 710.

According to an embodiment of the disclosure, in operation S50 of obtaining distance information, the electronic device 100 may obtain the distance information via the distance sensor 120. However, the disclosure is not limited thereto, and the electronic device 100 may obtain distance information about a distance between the image projection unit 700 and the projection area 710, from an external electronic device.

According to an embodiment of the disclosure, the at least one processor 140 may execute instructions or program code of the distance information obtainment module 132 to obtain the distance information via the distance sensor 120.

According to an embodiment of the disclosure, in operation S100 of determining a reference line, the reference line may be determined based on the obtained distance information.

According to an embodiment of the disclosure, the reference line may indicate a line that includes information about a point in the projection area 710 which is farthest from the image projection unit 700, and that is a reference of calculating a distance between the image projection unit 700 and the projection area 710. The reference line may be a line of a reference of calculating a distance between the image projection unit 700 and the plurality of pixel areas 711 and 712.

According to an embodiment of the disclosure, in operation S100 of determining a reference line in the projection area 710, based on the obtained distance information, the electronic device 100 may determine the reference line in the projection area 710, based on the obtained distance information. The at least one processor 140 may execute instructions or program code of the reference line determination module 134 to determine the reference line in the projection area 710, based on the obtained distance information.

According to an embodiment of the disclosure, the electronic device 100 may perform operation S110 of obtaining a plurality of pieces of pixel distance information about distances between each of the plurality of pixel areas 711 and 712 and a reference line, using the reference line determined based on the distance information.

According to an embodiment of the disclosure, in operation S110 of calculating a distance between each of the plurality of pixel areas 711 and 712 and the reference line, the electronic device 100 may calculate the distance between each of the plurality of pixel areas 711 and 712 and the reference line, based on the reference line.

According to an embodiment of the disclosure, as the reference line includes information about the point in the projection area 710 which is farthest from the image projection unit 700, a point far from the reference line may be a point whose distance to the image projection unit 700 is close. Therefore, as the distance between the reference line and each of the plurality of pixel areas 711 and 712 is calculated, a distance between each of the plurality of pixel areas 711 and 712 and the projection unit 700 may be calculated.

According to an embodiment of the disclosure, the at least one processor 140 may calculate a distance between a reference line and each of the plurality of pixel areas 711 and 712, based on the reference line.

Figure 10:
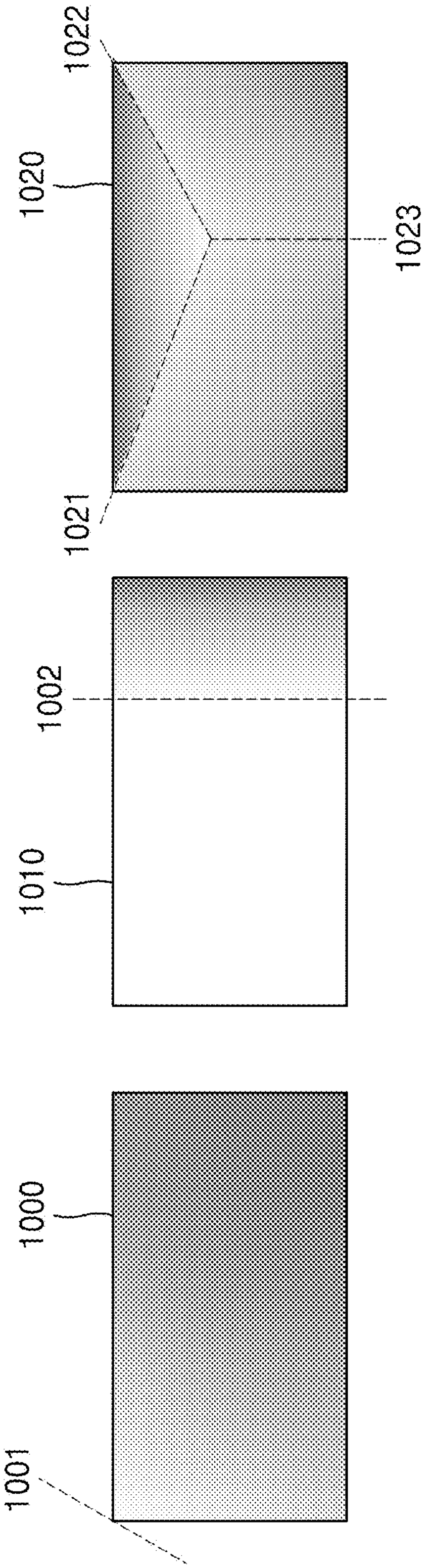
FIG. 10 is a diagram illustrating an example operation of determining a reference line in a projection area, according to various embodiments.

Referring to FIGS. 3, 7, and 10, in an embodiment of the disclosure, FIG. 10 illustrates a plurality of captured images 1000, 1010, and 1020 obtained by respectively capturing a plurality of images projected onto the projection area 710. According to an embodiment of the disclosure, the electronic device 100 may obtain a plurality of pieces of information about the plurality of images projected onto the projection area 710, via the plurality of captured images 1000, 1010, and 1020.

According to an embodiment of the disclosure, dim parts of the plurality of captured images 1000, 1010, and 1020 shown in FIG. 10 may be images displayed on projection areas whose distances from the image projection unit 700 are far. Bright parts of the plurality of captured images 1000, 1010, and 1020 may be images displayed on projection areas whose distances from the image projection unit 700 are close.

According to an embodiment of the disclosure, the electronic device 100 may determine a reference line using information about the plurality of images included in the plurality of captured images 1000, 1010, and 1020.

According to an embodiment of the disclosure, the plurality of captured images 1000, 1010, and 1020 may include the first captured image 1000, the second captured image 1010, and the third captured image 1020.

According to an embodiment of the disclosure, the first captured image 1000 may be a captured image of a case in which the image projection unit 700 projects an image onto one surface, and a distance to the image projection unit 700 increases at the lower right of the one surface.

Here, the electronic device 100 may determine a reference line 1001 to include information about the upper left (a point farthest from the image projection unit 700) of the first captured image 1000. The reference line 1001 determined based on the first captured image 1000 may be referred to as the first reference line 1001.

According to an embodiment of the disclosure, an angle formed between the first reference line 1001 and the first captured image 1000 may be determined to correspond to an angle at which the image projection unit 700 projects an image toward the projection area 710.

According to an embodiment of the disclosure, the electronic device 100 may generate a plurality of sub-distance correction coefficients corresponding to a plurality of pixel areas, so that a size of each of the plurality of pixel areas decreases when each of the plurality of pixel areas becomes distant from the first reference line 1001.

According to an embodiment of the disclosure, the second captured image 1010 may be a captured image of a case in which the image projection unit 700 projects an image onto two surfaces.

In this regard, the electronic device 100 may determine a reference line 1002 to include information about a boundary between the two surfaces of the second captured image 1010. The reference line 1002 determined based on the second captured image 1010 may be referred to as the second reference line 1002.

According to an embodiment of the disclosure, the third captured image 1020 may be a captured image of a case in which the image projection unit 700 projects an image onto three surfaces.

In this regard, the electronic device 100 may determine reference lines 1021, 1022, and 1023 to each include information about each boundary of the three surfaces of the third captured image 1020. The reference lines 1021, 1022, and 1023 determined based on the third captured image 1020 may be referred to as the first sub-reference line 1021, the second sub-reference line 1022, and the third sub-reference line 1023.

According to an embodiment of the disclosure, the electronic device 100 may generate a plurality of sub-distance correction coefficients corresponding to a plurality of pixel areas, so that a size of each of the plurality of pixel areas decreases when each of the plurality of pixel areas becomes distant from a reference line.

Figure 11:
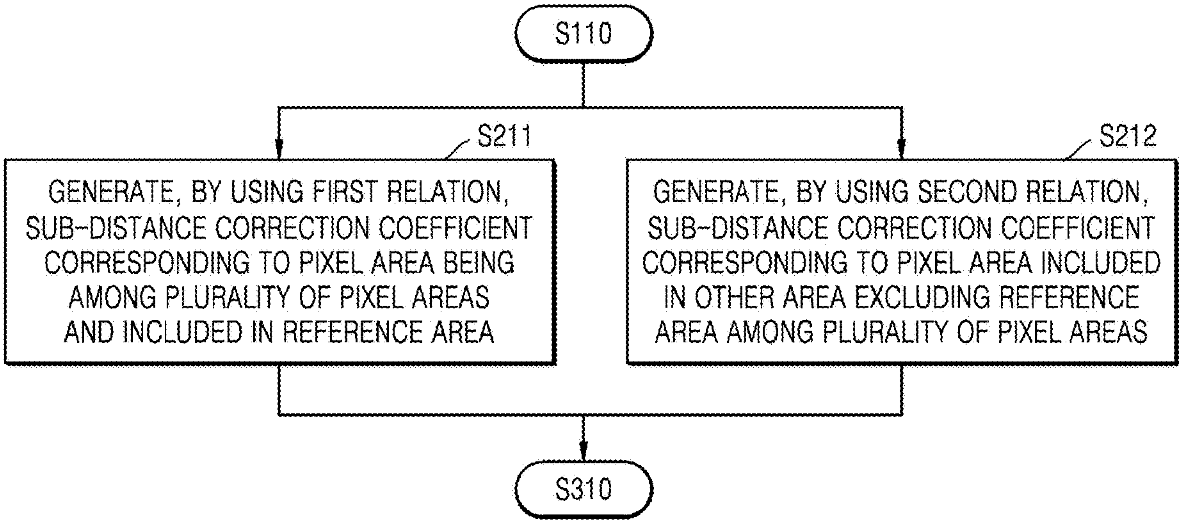
FIG. 11 is a flowchart illustrating an example operation of generating a corrected image using different relations of a plurality of pixel areas, according to various embodiments.
Figure 12:
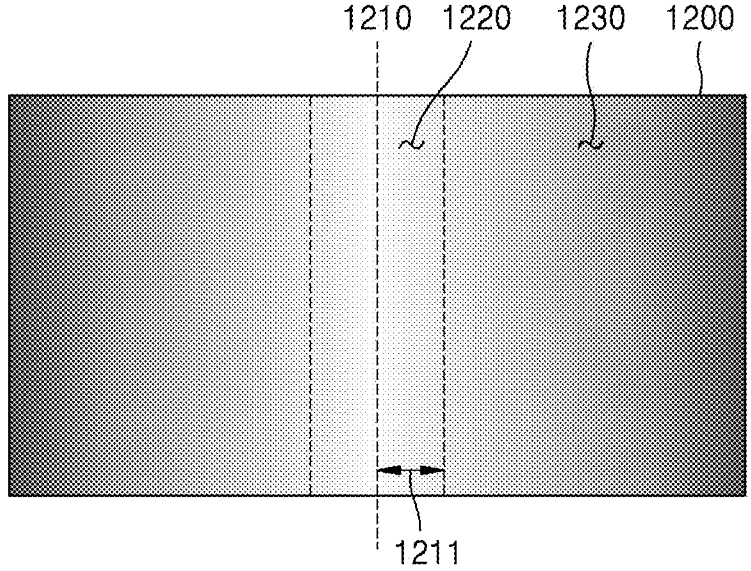
FIG. 12 is a diagram illustrating an example operation of generating a corrected image using different relations of a plurality of pixel areas, according to various embodiments.

FIG. 11 is a flowchart illustrating an example operation of generating a corrected image using different relations of a plurality of pixel areas, according to various embodiments. FIG. 12 is a diagram illustrating an example of the operation of generating a corrected image using different relations of a plurality of pixel areas, according to various embodiments. Hereinafter, the same operations and configurations as operations and configuration described with reference to FIGS. 4 and 8 are applied the same reference numerals, and redundant descriptions thereof may not be repeated.

Referring to FIGS. 3, 6, and 11, in an embodiment of the disclosure, the operating method of the electronic device 100 may include, after operation S110 of calculating a distance between each of a plurality of pixel areas and a reference line, operation S211 of generating, using the first relation, a sub-distance correction coefficient corresponding to at least one pixel area among the plurality of pixel areas, the at least one pixel area being included in a reference area within a preset distance from the reference line.

According to an embodiment of the disclosure, the first relation may be the preset relation to indicate a relation between a distance and a size, the distance being calculated between a reference line and a pixel area and the size being of a sub-distance correction coefficient corresponding to the pixel area.

The first relation may be the preset (e.g., specified) relation to indicate a relation between the distance calculated based on the reference line and the size of the sub-distance correction coefficient. The first relation may be the relation set using the first graph 800 shown in FIG. 8. For example, the first relation may be the relation set using the first graph 800, so that a size of a distance correction coefficient may increase when a distance to the reference line decreases.

According to an embodiment of the disclosure, the at least one processor 140 may execute instructions or program code of the distance correction coefficient generation module 135 to generate, using the first relation, a sub-distance correction coefficient corresponding to at least one pixel area among the plurality of pixel areas, the at least one pixel area being included in a reference area within a preset distance from the reference line.

According to an embodiment of the disclosure, the operating method of the electronic device 100 may include, after operation S110 of calculating a distance between each of a plurality of pixel areas and a reference line, operation S212 of generating, using the second relation, a sub-distance correction coefficient corresponding to at least one pixel area included in other area excluding the reference area among the plurality of pixel areas.

According to an embodiment of the disclosure, the second relation may be the relation that is different from the first relation and is to indicate a relation between a distance and a size, the distance being calculated between a reference line and a pixel area and the size being of a sub-distance correction coefficient corresponding to the pixel area. The second relation may be the relation that is different from the first relation and is to indicate a relation between the distance calculated based on the reference line and the size of the sub-distance correction coefficient. Here, the second relation may be the relation set using the second graph 810 shown in FIG. 8.

According to an embodiment of the disclosure, the at least one processor 140 may execute instructions or program code of the distance correction coefficient generation module 135 to generate, using the second relation, a sub-distance correction coefficient corresponding to at least one pixel area among the plurality of pixel areas, the at least one pixel area being included in a reference area within a preset distance from the reference line.

Referring to FIGS. 3 and 12, in an embodiment of the disclosure, FIG. 12 illustrates a projection area 1200 and a plurality of sub-distance correction coefficients. The projection area 1200 shown in FIG. 12 may correspond to a case in which the image projection unit 110 projects an image onto two surfaces. A bright part of FIG. 12 may be a part in which a size of a sub-distance correction coefficient is large. A dim part of FIG. 12 may be a part in which a size of a sub-distance correction coefficient is small.

According to an embodiment of the disclosure, a boundary between the two surfaces included in the projection area 1200 may be determined as a reference line 1210. For example, an area among the projection area 1200 which is located within a preset distance 1211 from the reference line 1210 may be referred to as a reference area 1220. The projection area 1200 may include other area 1230 excluding the reference area 1220.

According to an embodiment of the disclosure, a sub-distance correction coefficient corresponding to at least one pixel area included in the reference area 1220 among the plurality of pixel areas included in the projection area 1200 may be generated using the first relation.

According to an embodiment of the disclosure, a sub-distance correction coefficient corresponding to at least one pixel area included in the other area 1230 among the plurality of pixel areas included in the projection area 1200 may be generated using the second relation.

According to an embodiment of the disclosure, variation in a size of a sub-distance correction coefficient, according to a distance difference from the reference line 1210, may be larger in the first relation than the second relation. Therefore, the reference area 1220 for which a sub-distance correction coefficient is generated using the first relation may have a large size difference in a sub-distance correction coefficient according to the distance difference from the reference line 1210, compared to the other area 1230 for which a sub-distance correction coefficient is generated using the second relation.

According to an embodiment of the disclosure, the reference area 1220 may be an area including the reference line 1210. The reference line 1210 may correspond to a boundary between two surfaces, and may be an area farthest from the image projection unit 110. Accordingly, a pixel grayscale of a pixel image displayed on the projection area 1200 may be viewed to a user at a lowest level. In order to compensate a pixel grayscale of a pixel image displayed on the reference line 1210, a sub-distance correction coefficient may be generated to have a large value.

An area close to the reference line 1210 may be an area from among the projection area 1200, which has large variation in a distance to the image projection unit 110. An area from the reference line 1210 to the preset distance 1211 may be set as the reference area 1220 which has large variation in a distance to the image projection unit 110.

As a sub-distance correction coefficient corresponding to a pixel area included in the reference area 1220 is generated using the first relation with which variation in a size of the sub-distance correction coefficient according to the distance difference from the reference line 1210 is relatively large, compared to the second relation, it is possible to prevent and/or reduce the likelihood that an image having an irregular grayscale at an area close to the reference line 1210 is provided to a user.

A sub-distance correction coefficient is generated in the other area 1230 excluding the reference area 1220, using the second relation with which a size of the sub-distance correction coefficient is regularly changed according to the distance difference from the reference line 1210, so that it is possible to provide the user with an image in which a grayscale is smoothly displayed in the other area 1230.

According to an embodiment of the disclosure, the operating method of the electronic device 100 may include operation S310 of generating a corrected image including a plurality of sub-corrected grayscales generated by multiplying each of a plurality of pixel grayscales by a plurality of sub-distance correction coefficients. In this regard, the plurality of sub-distance correction coefficients may include the sub-distance correction coefficient generated using the first relation in operation S211 and the sub-distance correction coefficient generated using the second relation in operation S212.

Figure 13:
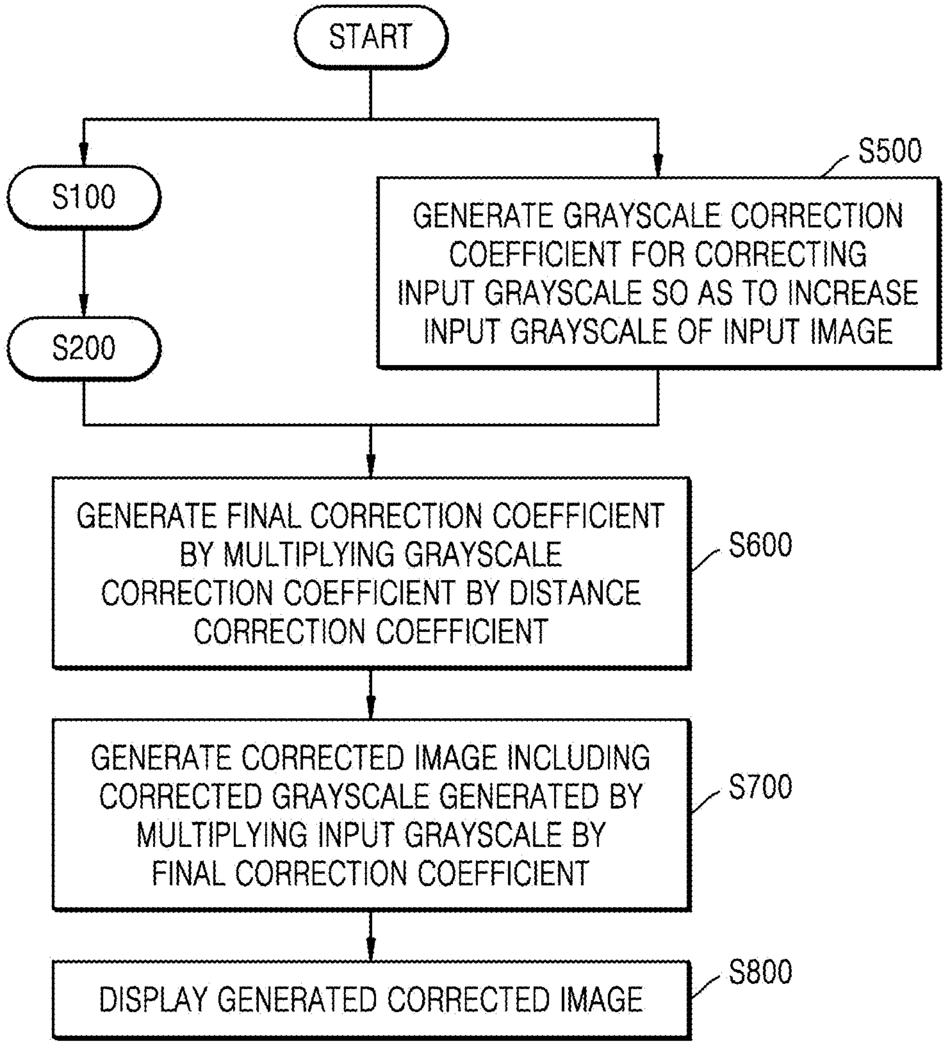
FIG. 13 is a flowchart illustrating an example operation of generating a corrected image by reflecting a grayscale of an input image, according to various embodiments.

FIG. 13 is a flowchart illustrating an example operation of generating a corrected image by reflecting a grayscale of an input image, according to various embodiments. FIG. 14 is a graph illustrating the operation of generating a corrected image by reflecting a grayscale of an input image, according to various embodiments. FIG. 15 is a diagram illustrating an example grayscale correction coefficient in which a grayscale of an input image is reflected, according to various embodiments. Hereinafter, same operations as operations described with reference to FIG. 4 are applied the same reference numerals, and redundant descriptions thereof may not be repeated here.

Referring to FIGS. 3, 4, and 13, in an embodiment of the disclosure, the operating method of the electronic device 100 may include operation S500 of generating a grayscale correction coefficient for correcting an input grayscale so as to increase the input grayscale of an input image.

According to an embodiment of the disclosure, in operation S500 of generating a grayscale correction coefficient, the electronic device 100 may generate the grayscale correction coefficient for correcting the input grayscale so as to increase the input grayscale of the input image. The electronic device 100 may generate, based on the obtained input image, the grayscale correction coefficient for correcting the input grayscale of the input image to a corrected grayscale.

According to an embodiment of the disclosure, in operation S500 of generating the grayscale correction coefficient, the grayscale correction coefficient may be generated so that a size of the grayscale correction coefficient increases when the input grayscale decreases. The more the input grayscale of the input image decrease, the more the correction level with respect to the input grayscale may increase.

Figure 14:
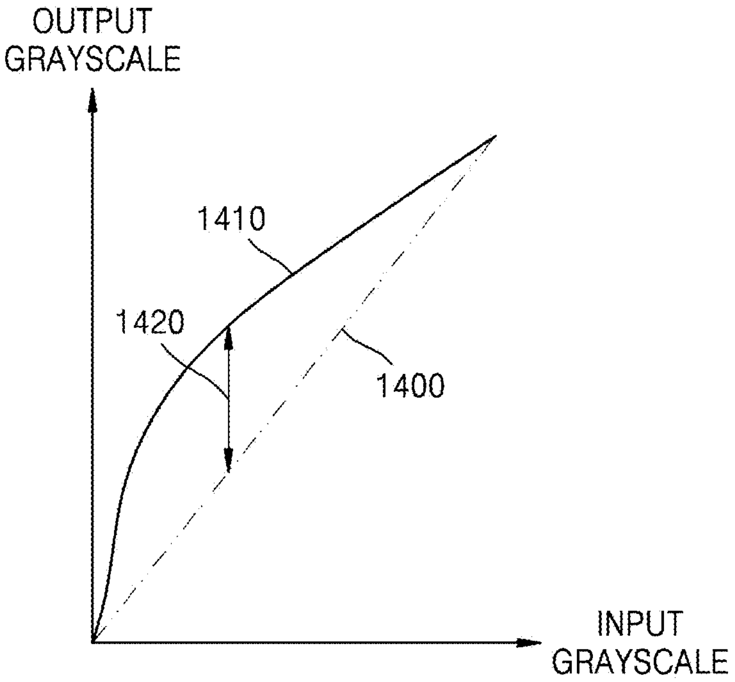
FIG. 14 is a graph illustrating an operation of generating a corrected image by reflecting a grayscale of an input image, according to various embodiments.

Referring to FIG. 14, in an embodiment of the disclosure, FIG. 14 illustrates a third graph 1400 and a fourth graph 1410 which indicate an input grayscale of an input image and an output grayscale of an output image. An X-axis may be a size axis of the input grayscale, and a Y-axis may be a size axis of the output grayscale. The output image may indicate an image the image projection unit 110 displays on the projection area 300. The output grayscale may indicate a grayscale included in the output image.

According to an embodiment of the disclosure, the third graph 1400 is a graph indicating a case in which the input grayscale is not corrected to a corrected grayscale using a grayscale correction coefficient, and thus, is displayed as the output grayscale via the image projection unit 110. The fourth graph 1410 is a graph indicating a case in which the input grayscale is corrected to a corrected grayscale using the grayscale correction coefficient, and thus, the corrected grayscale is displayed as the output grayscale via the image projection unit 110.

In an embodiment of the disclosure, referring to the third graph 1400 and the fourth graph 1410, the corrected grayscale and the input grayscale have a difference of a corrected value 1420. The corrected value 1420 may be determined according to a size of the grayscale correction coefficient. The more the size of the grayscale correction coefficient increases, the more the corrected value 1420 may increase.

In an embodiment of the disclosure, referring to the fourth graph 1410, the grayscale correction coefficient may be a coefficient for correcting the input grayscale to the relatively large corrected grayscale. According to an embodiment of the disclosure, when the input grayscale is a grayscale of 40 grayscale, the grayscale correction coefficient may be a coefficient for correcting the input grayscale to a corrected grayscale of 60 grayscale. When the input grayscale is corrected to the corrected grayscale by multiplying the input grayscale by the grayscale correction coefficient, the grayscale correction coefficient may be 1.5.

Figure 15:
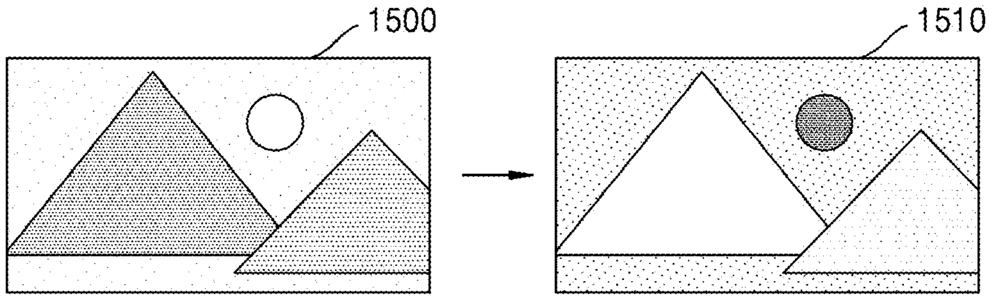
FIG. 15 is a diagram illustrating an example grayscale correction coefficient in which a grayscale of an input image is reflected, according to various embodiments.

Referring to FIGS. 14 and 15, in an embodiment of the disclosure, FIG. 15 illustrates an input image 1500 including a plurality of pixel images and a grayscale correction coefficient 1510 for correcting the input image 1500.

According to an embodiment of the disclosure, the input image 1500 may include the plurality of pixel images, and an input grayscale may include a plurality of pixel grayscales respectively corresponding to the plurality of pixel images. The grayscale correction coefficient 1510 may include a plurality of sub-grayscale correction coefficients for respectively correcting the plurality of pixel grayscales.

According to an embodiment of the disclosure, when an input grayscale of the input image 1500 decreases, the grayscale correction coefficient 1510 may be generated to have a large size to correct the input grayscale. Here, in the input image 1500 shown in FIG. 15, a bright part may indicate a pixel image having a high pixel grayscale, and a dim part may indicate a pixel image having a low pixel grayscale.

As a first pixel grayscale of a first pixel image among the plurality of pixel images is less than a second pixel grayscale of a second pixel image, a size of a first sub-grayscale correction coefficient corresponding to the first pixel image among the plurality of sub-grayscale correction coefficients may be greater than a size of a second sub-grayscale correction coefficient corresponding to the second pixel image.

According to an embodiment of the disclosure, when the first pixel grayscale of the first pixel image (e.g., a dim triangular part) is 30 grayscale, and the second pixel grayscale of the second pixel image (e.g., a bright circular part) is 210 grayscale, the first sub-grayscale correction coefficient (e.g., a bright triangular part in the grayscale correction coefficient 1510) for correcting an input grayscale of the first pixel image may have a size of 2, and the second sub-grayscale correction coefficient (e.g., a dim circular part in the grayscale correction coefficient 1510) for correcting an input grayscale of the second pixel image may have a size of 1.1. However, these values are merely an example, and the disclosure is not limited thereto.

Referring back to FIG. 13, the operating method of the electronic device 100 may include operation S600 of generating a final correction coefficient by multiplying a grayscale correction coefficient by a distance correction coefficient.

According to an embodiment of the disclosure, in operation S600 of generating a final correction coefficient by multiplying a grayscale correction coefficient by a distance correction coefficient, the electronic device 100 may generate the final correction coefficient by multiplying the grayscale correction coefficient by the distance correction coefficient.

The final correction coefficient and an operation of generating the final correction coefficient will be described in greater detail below with reference to FIG. 16.

According to an embodiment of the disclosure, the operating method of the electronic device 100 may include operation S700 of generating a corrected image including a corrected grayscale generated by multiplying an input grayscale of an input image by a final correction coefficient.

According to an embodiment of the disclosure, in operation S700 of generating a corrected image including a corrected grayscale generated by multiplying an input grayscale of an input image by a final correction coefficient, the electronic device 100 may generate the corrected image including the corrected grayscale generated by multiplying the input grayscale of the input image by the final correction coefficient.

An operation of generating the corrected image using the final correction coefficient will be described in greater detail below with reference to FIG. 17.

According to an embodiment of the disclosure, the operating method of the electronic device 100 may include operation S800 of displaying a generated corrected image via the image projection unit 110.

According to an embodiment of the disclosure, in operation S800 of displaying a corrected image, the electronic device 100 may control the image projection unit 110 to display the generated corrected image.

Figure 16:
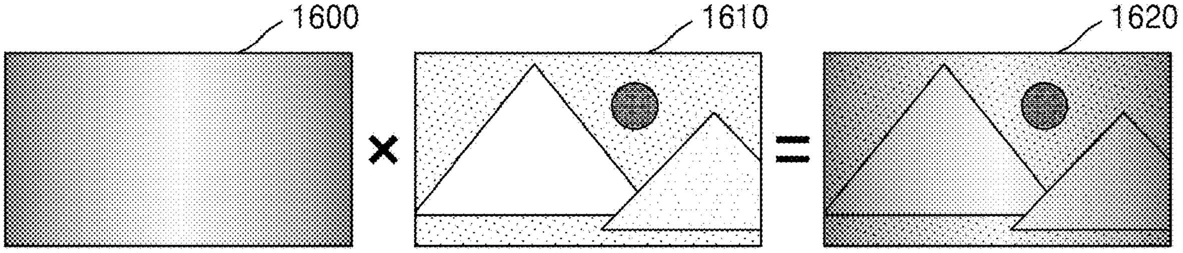
FIG. 16 is a diagram illustrating an example operation of generating a final correction coefficient by multiplying a grayscale correction coefficient by a distance correction coefficient, according to various embodiments.

FIG. 16 is a diagram illustrating an example operation of generating a final correction coefficient by multiplying a grayscale correction coefficient by a distance correction coefficient, according to various embodiments.

Referring to FIGS. 1, 3, 13, and 16, in an embodiment of the disclosure, FIG. 16 illustrates a distance correction coefficient 1600, a grayscale correction coefficient 1610, and a final correction coefficient 1620.

According to an embodiment of the disclosure, the distance correction coefficient 1600 may be generated based on distance information about a distance between a reference line and the projection area 300. The distance correction coefficient 1600 shown in FIG. 16 is the distance correction coefficient 1600 generated for a case in which the projection area 300 includes two surfaces and a boundary therebetween.

According to an embodiment of the disclosure, a bright part of the distance correction coefficient 1600 may be a part in which a size of a distance correction coefficient is large, and a dim part may be a part in which a size of the distance correction coefficient is small.

According to an embodiment of the disclosure, the distance correction coefficient 1600 may have a largest value at a boundary that is farthest from the image projection unit 110 and is located at the middle of the projection area 300. The distance correction coefficient 1600 may have a value that decreases as a distance to the image projection unit 110 decreases from the boundary located at the middle of the projection area 300 toward both sides. The distance correction coefficient 1600 may have the value that gradually decreases as it becomes far from the reference line.

According to an embodiment of the disclosure, the grayscale correction coefficient 1610 may be generated based on an input grayscale of an input image. The grayscale correction coefficient 1610 shown in FIG. 16 may be equal to the grayscale correction coefficient 1510 described with reference to FIG. 15.

According to an embodiment of the disclosure, the final correction coefficient 1620 may be generated by multiplying the distance correction coefficient 1600 by the grayscale correction coefficient 1610. A bright part of the final correction coefficient 1620 may be a part in which a size of a final correction coefficient is large, and a dim part may be a part in which a size of the final correction coefficient is small.

According to an embodiment of the disclosure, the final correction coefficient 1620 may have a largest value at a boundary that is farthest from the image projection unit 110 and is located at the middle of the projection area 300. The final correction coefficient 1620 may have a value that decreases as a distance to the image projection unit 110 decreases from the boundary located at the middle of the projection area 300 toward both sides.

Accordingly, as the input grayscale of the input image is corrected using the final correction coefficient 1620, even when a distance between the image projection unit 110 and the projection area 300 is not uniform, the electronic device 100 may provide a corrected image 320 to a user by displaying the corrected image 320 having a regular grayscale distribution on the projection area 300.

A size of the final correction coefficient 1620 may have a large value in an area corresponding to a pixel area in which the input grayscale of the input image is low. A size of the final correction coefficient 1620 may have a small value in an area corresponding to a pixel area in which the input grayscale of the input image is high.

Accordingly, when correcting the input grayscale of the input image according to a distance between the image projection unit 110 and the projection area 300, a correction level of a pixel area having a relatively low input grayscale in the input image may be increased, and a correction level of a pixel area having a relatively high input grayscale may be decreased.

By doing so, it is possible to prevent and/or reduce a likelihood that a pixel area having a high input grayscale in the input image is excessively corrected due to a component of the distance correction coefficient 1600 in the final correction coefficient 1620. Also, it is possible to prevent and/or reduce a likelihood that a pixel area having a low input grayscale in the input image is insufficiently corrected due to the component of the distance correction coefficient 1600 in the final correction coefficient 1620.

Figure 17:
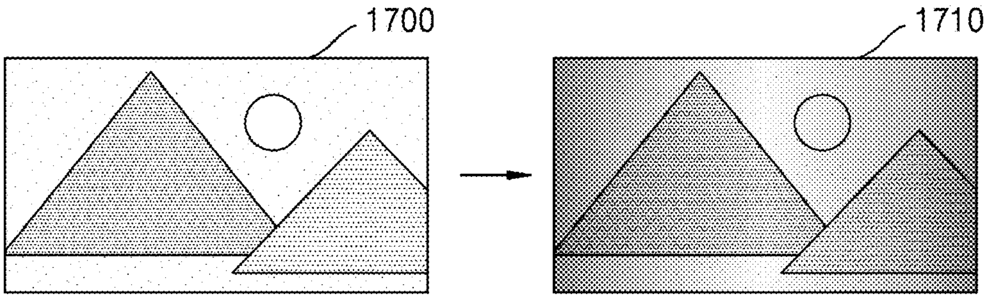
FIG. 17 is a diagram illustrating an example operation of generating a corrected image by correcting an input image using a final correction coefficient, according to various embodiments.

FIG. 17 is a diagram illustrating an example operation of generating a corrected image by correcting an input image using a final correction coefficient, according to various embodiments.

Referring to FIGS. 16 and 17, in an embodiment of the disclosure, FIG. 17 illustrates an input image 1700 and a corrected image 1710.

According to an embodiment of the disclosure, the corrected image 1710 may be an image including a corrected grayscale generated by correcting an input grayscale in the input image 1700 using the final correction coefficient 1620 shown in FIG. 16.

According to an embodiment of the disclosure, the input image 1700 may include a plurality of pixel images respectively corresponding to a plurality of pixels, and each of the plurality of pixel images may include a plurality of pixel grayscales.

According to an embodiment of the disclosure, the final correction coefficient 1620 may include a plurality of sub-final correction coefficients for respectively correcting the plurality of pixel grayscales of the plurality of pixel images. Each of the plurality of sub-final correction coefficients may have different sizes according to distances between the image projection unit 110 and the plurality of pixel images included in the projection area 300. Each of the plurality of sub-final correction coefficients may have different sizes according to the distances between the image projection unit 110 and the plurality of pixel images included in the projection area 300, and the plurality of pixel grayscales of the plurality of pixel images.

According to an embodiment of the disclosure, the corrected image 1710 may include a plurality of corrected pixel grayscales generated by correcting each of the plurality of pixel grayscales of the plurality of pixel images using the plurality of sub-final correction coefficients.

According to an embodiment of the disclosure, a plurality of corrected pixel grayscales of the corrected image 1710 may include the corrected pixel grayscale corrected with a grayscale of a large size, compared to the input grayscale of the input image 1700, in an area of the projection area 300 which is far from the image projection unit 110, for example, in the area close to a boundary between two surfaces. The plurality of corrected pixel grayscales of the corrected image 1710 may include the corrected pixel grayscale corrected with a grayscale of a small size, compared to the input grayscale of the input image 1700, in an area of the projection area 300 which is close to the image projection unit 110, for example, in the area far from the boundary between the two surfaces.

According to an embodiment of the disclosure, a level at which a corrected pixel grayscale of the corrected image 1710 which corresponds to a pixel area in which an input grayscale of the input image 1700 is high is corrected from the input grayscale of the input image 1700 may be less than a level at which a corrected pixel grayscale of the corrected image 1710 which corresponds to a pixel area in which an input grayscale of the input image 1700 is low is corrected from the input grayscale of the input image 1700.

In the electronic device 100 of the disclosure, as the corrected image 1710 generated by correcting the input image 1700 is displayed on the projection area 300 via the image projection unit 110, even when a distance between the image projection unit 110 and the projection area 300 is not uniform, an image having a regular grayscale distribution may be provided to a user.

The electronic device 100 of the disclosure may calculate a distance between the image projection unit 110 and the projection area 300 using a distance between a reference line and the projection area 300, the distance being calculated using the reference line. The reference line may be determined based on not only distance information but also a captured image. By doing so, the electronic device 100 of the disclosure may decrease an amount of computation necessary in compensating a distance irregularity between the image projection unit 110 and the projection area 300.

In the electronic device 100 of the disclosure, as the corrected image 1710 generated by correcting the input image 1700 is displayed on the projection area 300 via the image projection unit 110, even when the input image has various input grayscales, an image in which the distance irregularity between the image projection unit 110 and the projection area 300 is uniformly corrected may be provided to the user.

Effects that are obtainable from the disclosure are not limited to the aforementioned effects, and other unstated effects will be clearly understood by one of ordinary skill in the art in view of the disclosure.

In order to address the aforementioned technical problems, an example embodiment of the disclosure provides an electronic device for projecting an image. The electronic device may include: an image projection unit comprising a projector configured to project the image onto a projection area; memory storing at least one instruction; at least one processor, comprising processing circuitry, individually and/or collectively, configured to execute the at least one instruction stored in the memory, and to: determine a reference line including information about a point in the projection area, the point being farthest from the image projection unit; generate a distance correction coefficient for correcting an input grayscale of an input image, based on the reference line; and control the image projection unit to display a corrected image including a corrected grayscale generated by multiplying the input grayscale by the distance correction coefficient.

According to an example embodiment of the disclosure, the image projection unit may include a plurality of pixels. The projection area may include a plurality of pixel areas respectively corresponding to the plurality of pixels. At least one processor, individually and/or collectively, may be configured to: generate the distance correction coefficient to increase a size of the distance correction coefficient based on distances between the reference line and the plurality of pixel areas decreasing, based on the reference line.

According to an example embodiment of the disclosure, the input image may include a plurality of pixel images respectively corresponding to the plurality of pixels. The distance correction coefficient may include a plurality of sub-distance correction coefficients for respectively correcting a plurality of pixel grayscales of the plurality of pixel images. At least one processor, individually and/or collectively, may be configured to: obtain a plurality of pieces of pixel distance information about the distances between each of the plurality of pixel areas and the reference line, based on the reference line; generate the plurality of sub-distance correction coefficients, based on the plurality of pieces of pixel distance information; and generate the corrected image to include a plurality of sub-corrected grayscales generated by multiplying each of the plurality of pixel grayscales by the plurality of sub-distance correction coefficients.

According to an example embodiment of the disclosure, at least one processor, individually and/or collectively, may be configured to: generate the plurality of sub-distance correction coefficients to increase respective sizes of the plurality of sub-distance correction coefficients based on the distances between each of the plurality of pixel areas and the reference line decreasing.

According to an example embodiment of the disclosure, the plurality of pixel areas may include a first pixel area and a second pixel area. The plurality of sub-distance correction coefficients may include a first sub-distance correction coefficient corresponding to the first pixel area, and a second sub-distance correction coefficient corresponding to the second pixel area. At least one processor, individually and/or collectively, may be configured to: based on a second distance between the second pixel area and the reference line being less than a first distance between the first pixel area and the reference line, generate the first sub-distance correction coefficient and the second sub-distance correction coefficient so that a size of the second sub-distance correction coefficient is greater than a size of the first sub-distance correction coefficient.

According to an example embodiment of the disclosure, at least one processor, individually and/or collectively, may be configured to: generate a grayscale correction coefficient for correcting the input grayscale to increase the input grayscale of the input image; generate a final correction coefficient by multiplying the grayscale correction coefficient by the distance correction coefficient; and generate the corrected image including the corrected grayscale by multiplying the input grayscale by the final correction coefficient.

According to an example embodiment of the disclosure, at least one processor, individually and/or collectively, may be configured to: generate the grayscale correction coefficient to increase a size of the grayscale correction coefficient based on the input grayscale of the input image decreasing.

According to an example embodiment of the disclosure, the image projection unit may include the plurality of pixels. The input image may include the plurality of pixel images respectively corresponding to the plurality of pixels. The grayscale correction coefficient may include a plurality of sub-grayscale correction coefficients for respectively correcting the plurality of pixel grayscales of the plurality of pixel images. At least one processor, individually and/or collectively, may be configured to: based on a first pixel grayscale of a first pixel image among the plurality of pixel images being less than a second pixel grayscale of a second pixel image, generate a first sub-grayscale correction coefficient and a second sub-grayscale correction coefficient so that a size of the first sub-grayscale correction coefficient corresponding to the first pixel image and being among the plurality of sub-grayscale correction coefficients is greater than a size of the second sub-grayscale correction coefficient corresponding to the second pixel image.

According to an example embodiment of the disclosure, at least one processor, individually and/or collectively, may be configured to: determine the reference line, based on a captured image obtained by capturing the image projected onto the projection area; based on the projection area included in the captured image including at least two surfaces, determine an edge of the at least two surface as the reference line; and based on the projection area included in the captured image including one surface, determine a line including a point with a lowest brightness in the image as the reference line.

According to an example embodiment of the disclosure, the electronic device may further include a distance sensor. At least one processor, individually and/or collectively, may be configured to: obtain, via the distance sensor, distance information about a distance between the image projection unit and the projection area; and determine the reference line, based on the obtained distance information.

In order to address the aforementioned technical problems, an example embodiment of the disclosure provides a method of operating an electronic device projecting an image. The method may include: determining a reference line including information about a point in a projection area onto which the image is projected, the point being farthest from an image projection unit; generating a distance correction coefficient for correcting an input grayscale of an input image, based on the reference line; and displaying, as the image, a corrected image including a corrected grayscale generated by multiplying the input grayscale by the distance correction coefficient, via an image projection unit comprising a projector.

According to an example embodiment of the disclosure, the image projection unit may include a plurality of pixels. The projection area may include a plurality of pixel areas respectively corresponding to the plurality of pixels. The generating of the distance correction coefficient may include: generating the distance correction coefficient to increase a size of the distance correction coefficient based on distances between the reference line and the plurality of pixel areas decreasing, based on the reference line.

According to an example embodiment of the disclosure, the input image may include a plurality of pixel images respectively corresponding to the plurality of pixels. The distance correction coefficient may include a plurality of sub-distance correction coefficients for respectively correcting a plurality of pixel grayscales of the plurality of pixel images. The generating of the distance correction coefficient may include: obtaining a plurality of pieces of pixel distance information about the distances between each of the plurality of pixel areas and the reference line, based on the reference line; and generating the plurality of sub-distance correction coefficients, based on the plurality of pieces of pixel distance information. The displaying of, as the image, the corrected image may include: generating the corrected image to include a plurality of sub-corrected grayscales generated by multiplying each of the plurality of pixel grayscales by the plurality of sub-distance correction coefficients.

According to an example embodiment of the disclosure, the generating of the plurality of sub-distance correction coefficients may include: generating the plurality of sub-distance correction coefficients to increase respective sizes of the plurality of sub-distance correction coefficients based on the distances between each of the plurality of pixel areas and the reference line decreasing.

According to an example embodiment of the disclosure, the plurality of pixel areas may include a first pixel area and a second pixel area. The plurality of sub-distance correction coefficients may include a first sub-distance correction coefficient corresponding to the first pixel area, and a second sub-distance correction coefficient corresponding to the second pixel area. The generating of the plurality of sub-distance correction coefficients may include: based on a second distance between the second pixel area and the reference line being less than a first distance between the first pixel area and the reference line, generating the first sub-distance correction coefficient and the second sub-distance correction coefficient so that a size of the second sub-distance correction coefficient is greater than a size of the first sub-distance correction coefficient.

According to an example embodiment of the disclosure, the method may include: generating a grayscale correction coefficient for correcting the input grayscale so as to increase the input grayscale of the input image; and generating a final correction coefficient by multiplying the grayscale correction coefficient by the distance correction coefficient. The displaying of, as the image, the corrected image may include: generating the corrected image including the corrected grayscale generated by multiplying the input grayscale by the final correction coefficient. The generating of the grayscale correction coefficient may include: generating the grayscale correction coefficient to increase a size of the grayscale correction coefficient based on the input grayscale decreasing.

According to an example embodiment of the disclosure, the image projection unit may include a plurality of pixels. The input image may include a plurality of pixel images respectively corresponding to the plurality of pixels. The grayscale correction coefficient may include a plurality of sub-grayscale correction coefficients for respectively correcting the plurality of pixel grayscales of the plurality of pixel images. The generating of the grayscale correction coefficient may include, based on a first pixel grayscale of a first pixel image among the plurality of pixel images being less than a second pixel grayscale of a second pixel image, generating a first sub-grayscale correction coefficient and a second sub-grayscale correction coefficient so that a size of the first sub-grayscale correction coefficient corresponding to the first pixel image and being among the plurality of sub-grayscale correction coefficients is greater than a size of the second sub-grayscale correction coefficient corresponding to the second pixel image.

According to an example embodiment of the disclosure, the determining of the reference line may include: determining the reference line, based on a captured image obtained by capturing the image projected onto the projection area; based on the projection area included in the captured image including at least two surfaces, determining an edge of the at least two surface as the reference line; and based on the projection area included in the captured image includes one surface, determining a line including a point with a lowest brightness in the image as the reference line.

According to an example embodiment of the disclosure, the method may include obtaining, via a distance sensor, distance information about a distance between the image projection unit and the projection area. The determining of the reference line may include determining the reference line, based on the obtained distance information.

In order to address the aforementioned technical problems, a non-transitory computer-readable recording medium having recorded thereon a program for performing, on a computer, at least one of the operating methods according to an example embodiment of the disclosure may be provided.

A program executable by the electronic device described in the disclosure may be implemented as a hardware element, a software element, and/or a combination of hardware elements and software elements. The program is executable by any system capable of executing computer-readable instructions.

The software may include a computer program, code, instructions, or a combination of one or more thereof, and may configure the processor to operate as desired or may independently or collectively instruct the processor.

The software may be implemented as a computer program that includes instructions stored in computer-readable storage media. The computer-readable storage media may include, for example, magnetic storage media (e.g., a read-only memory (ROM), a random-access memory (RAM), floppy disks, hard disks, etc.) and optical storage media (e.g., a compact disc ROM (CD-ROM), a digital versatile disc (DVD), etc.). The computer-readable recording medium may be distributed in computer systems connected via a network and may store and execute computer-readable code in a distributed manner. The recording medium is readable by a computer, stored in memory, and executable by a processor.

The computer-readable storage medium may be provided in the form of a non-transitory storage medium. Here, the 'non-transitory storage medium' may refer, for example, to the storage medium being a tangible device and may not include signals (e.g., electromagnetic waves), and may refer, for example, to data that may be permanently or temporarily stored in the storage medium. For example, the non-transitory storage medium may include a buffer in which data is temporarily stored.

In addition, a program according to various example embodiments disclosed in the present disclosure may be provided in a computer program product. The computer program product may be traded as commodities between sellers and buyers.

The computer program product may include a software program and a computer-readable recording medium storing the software program. For example, the computer program product may include a product (e.g., a downloadable application) in the form of a software program electronically distributed via a manufacturer of the electronic device or an electronic market (e.g., Samsung Galaxy Store). For electronic distribution, at least part of the software program may be stored in a storage medium or temporarily generated. In this case, the storage medium may be a storage medium of a server of the manufacturer of the electronic device, a server of the electronic market, or a relay server for temporarily storing the S/W program.

Although various embodiments have been illustrated and described with reference to the drawings, various modifications and changes may be made by one skilled in the art from the above description. For example, suitable results may be obtained even when the described techniques are performed in a different order, or when components in a described electronic device, architecture, device, or circuit are coupled or combined in a different manner, or replaced or supplemented by other components or their equivalents. It will also be understood that any of the embodiment(s) described herein may be used in conjunction with any other embodiment(s) described herein.

What is claimed is:

1. An electronic device configured to project an image, the electronic device comprising:

an image projection unit comprising a projector comprising a plurality of pixels and configured to project the image onto a projection area comprising a plurality of pixel areas respectively corresponding to the plurality of pixels;

memory storing at least one instruction; and at least one processor, comprising processing circuitry, individually and/or collectively, configured to execute the at least one instruction stored in the memory, and to:

determine a reference line comprising information about a point in the projection area, the point being farthest from the image projection unit, generate a distance correction coefficient for correcting an input grayscale of an input image, based on the reference line, wherein the distance correction coefficient is generated to increase a size of the distance correction coefficient based on distances between the reference line and the plurality of pixel areas decreasing, based on the reference line, and control the image projection unit to display a corrected image comprising a corrected grayscale generated by multiplying the input grayscale by the distance correction coefficient.

2. The electronic device of claim 1, wherein the at least one processor, individually and/or collectively, is configured to:

generate a grayscale correction coefficient for correcting the input grayscale to increase the input grayscale of the input image, generate a final correction coefficient by multiplying the grayscale correction coefficient by the distance correction coefficient, and generate the corrected image comprising the corrected grayscale by multiplying the input grayscale by the final correction coefficient.

3. The electronic device of claim 1, wherein the input image comprises a plurality of pixel images respectively corresponding to the plurality of pixels, the distance correction coefficient comprises a plurality of sub-distance correction coefficients for respectively correcting a plurality of pixel grayscales of the plurality of pixel images, and the at least one processor, individually and/or collectively, is configured to:

obtain a plurality of pieces of pixel distance information about the distances between each of the plurality of pixel areas and the reference line, based on the reference line, generate the plurality of sub-distance correction coefficients, based on the obtained plurality of pieces of pixel distance information, and generate the corrected image to comprise a plurality of sub-corrected grayscales generated by multiplying each of the plurality of pixel grayscales by the plurality of sub-distance correction coefficients.

4. The electronic device of claim 3, wherein the at least one processor, individually and/or collectively, is configured to: generate the plurality of sub-distance correction coefficients to increase respective sizes of the plurality of sub-distance correction coefficients based on the distances between each of the plurality of pixel areas and the reference line decreasing.

5. The electronic device of claim 4, wherein:

the plurality of pixel areas comprise a first pixel area and a second pixel area, the plurality of sub-distance correction coefficients comprise a first sub-distance correction coefficient corresponding to the first pixel area, and a second sub-distance correction coefficient corresponding to the second pixel area, and the at least one processor, individually and/or collectively, is configured to: based on a second distance between the second pixel area and the reference line being less than a first distance between the first pixel area and the reference line, generate the first sub-distance correction coefficient and the second sub-distance correction coefficient so that a size of the second sub-distance correction coefficient is greater than a size of the first sub-distance correction coefficient.

6. An electronic device configured to project an image, the electronic device comprising:

an image projection unit comprising a projector configured to project the image onto a projection area;

memory storing at least one instruction; and at least one processor, comprising processing circuitry, individually and/or collectively, is configured to execute the at least one instruction stored in the memory, and to:

determine a reference line comprising information about a point in the projection area, the point being farthest from the image projection unit, generate a distance correction coefficient for correcting an input grayscale of an input image, based on the reference line, generate a grayscale correction coefficient for correcting the input grayscale to increase the input grayscale of the input image, generate a final correction coefficient by multiplying the grayscale correction coefficient by the distance correction coefficient, generate a corrected image comprising the corrected grayscale by multiplying the input grayscale by the final correction coefficient, and control the image projection unit to display the corrected image.

7. The electronic device of claim 6, wherein the at least one processor, individually and/or collectively is configured to generate the grayscale correction coefficient to increase a size of the grayscale correction coefficient based on the input grayscale of the input image decreasing.

8. The electronic device of claim 6, wherein the image projection unit comprises a plurality of pixels, the input image comprises a plurality of pixel images respectively corresponding to the plurality of pixels, the grayscale correction coefficient comprises a plurality of sub-grayscale correction coefficients for respectively correcting a plurality of pixel grayscales of the plurality of pixel images, and the at least one processor, individually and/or collectively, is configured to: based on a first pixel grayscale of a first pixel image among the plurality of pixel images being less than a second pixel grayscale of a second pixel image, generate a first sub-grayscale correction coefficient and a second sub-grayscale correction coefficient so that a size of the first sub-grayscale correction coefficient corresponding to the first pixel image and being among the plurality of sub-grayscale correction coefficients is greater than a size of the second sub-grayscale correction coefficient corresponding to the second pixel image.

9. The electronic device of claim 1, wherein the at least one processor, individually and/or collectively, is configured to:

determine the reference line, based on a captured image obtained by capturing the image projected onto the projection area, based on the projection area included in the captured image comprising at least two surfaces, determine an edge between the at least two surface as the reference line, and based on the projection area included in the captured image comprising one surface, determine a line comprising a point with a lowest brightness in the image as the reference line.

10. The electronic device of claim 9, further comprising: a distance sensor, wherein the at least one processor, individually and/or collectively, is configured to:

obtain, via the distance sensor, distance information about a distance between the image projection unit and the projection area, and determine the reference line, based on the obtained distance information.

11. A method of operating an electronic device projecting an image, the method comprising:

determining a reference line comprising information about a point in a projection area onto which the image is projected, the point being farthest from an image projection unit, the image projection unit comprising a projector;

generating a distance correction coefficient for correcting an input grayscale of an input image, based on the reference line; and displaying, as the image, a corrected image comprising a corrected grayscale generated by multiplying the input grayscale by the distance correction coefficient, via the image projection unit, wherein the image projection unit comprises a plurality of pixels, the projection area comprises a plurality of pixel areas respectively corresponding to the plurality of pixels, and the generating of the distance correction coefficient comprises generating the distance correction coefficient to increase a size of the distance correction coefficient based on distances between the reference line and the plurality of pixel areas decreasing, based on the reference line.

12. The method of claim 11, wherein the image projection unit comprises a plurality of pixels, the projection area comprises a plurality of pixel areas respectively corresponding to the plurality of pixels, and the generating of the distance correction coefficient comprises generating the distance correction coefficient to increase a size of the distance correction coefficient based on distances between the reference line and the plurality of pixel areas decreasing, based on the reference line.

13. The method of claim 11, wherein the input image comprises a plurality of pixel images respectively corresponding to the plurality of pixels, the distance correction coefficient comprises a plurality of sub-distance correction coefficients for respectively correcting a plurality of pixel grayscales of the plurality of pixel images, the generating of the distance correction coefficient comprises:

obtaining a plurality of pieces of pixel distance information about the distances between each of the plurality of pixel areas and the reference line, based on the reference line; and generating the plurality of sub-distance correction coefficients, based on the plurality of pieces of pixel distance information, and the displaying of, as the image, the corrected image comprises generating the corrected image to comprise a plurality of sub-corrected grayscales generated by multiplying each of the plurality of pixel grayscales by the plurality of sub-distance correction coefficients.

14. The method of claim 13, wherein the generating of the plurality of sub-distance correction coefficients comprises generating the plurality of sub-distance correction coefficients to increase respective sizes of the plurality of sub-distance correction coefficients based on the distances between each of the plurality of pixel areas and the reference line decreasing.

15. The method of claim 14, wherein the plurality of pixel areas comprise a first pixel area and a second pixel area, the plurality of sub-distance correction coefficients comprise a first sub-distance correction coefficient corresponding to the first pixel area, and a second sub-distance correction coefficient corresponding to the second pixel area, and the generating of the plurality of sub-distance correction coefficients comprises, based on a second distance between the second pixel area and the reference line being less than a first distance between the first pixel area and the reference line, generating the first sub-distance correction coefficient and the second sub-distance correction coefficient so that a size of the second sub-distance correction coefficient is greater than a size of the first sub-distance correction coefficient.

16. The method of claim 11, further comprising:

generating a grayscale correction coefficient for correcting the input grayscale to increase the input grayscale of the input image; and generating a final correction coefficient by multiplying the grayscale correction coefficient by the distance correction coefficient, wherein the displaying of, as the image, the corrected image comprises generating the corrected image comprising the corrected grayscale generated by multiplying the input grayscale by the final correction coefficient, and the generating of the grayscale correction coefficient comprises generating the grayscale correction coefficient to increase a size of the grayscale correction coefficient based on the input grayscale decreasing.

17. The method of claim 16, wherein the image projection unit comprises the plurality of pixels, the input image comprises a plurality of pixel images respectively corresponding to the plurality of pixels, the grayscale correction coefficient comprises a plurality of sub-grayscale correction coefficients for respectively correcting a plurality of pixel grayscales of the plurality of pixel images, and the generating of the grayscale correction coefficient comprises, based on a first pixel grayscale of a first pixel image among the plurality of pixel images being less than a second pixel grayscale of a second pixel image, generating a first sub-grayscale correction coefficient and a second sub-grayscale correction coefficient so that a size of the first sub-grayscale correction coefficient corresponding to the first pixel image and being among the plurality of sub-grayscale correction coefficients is greater than a size of the second sub-grayscale correction coefficient corresponding to the second pixel image.

18. The method of claim 11, wherein the determining of the reference line comprises:

determining the reference line, based on a captured image obtained by capturing the image projected onto the projection area;

based on the projection area included in the captured image comprising at least two surfaces, determining an edge between the at least two surface as the reference line; and based on the projection area included in the captured image comprising one surface, determining a line comprising a point with a lowest brightness in the image as the reference line.

19. The method of claim 18, further comprising: obtaining, via a distance sensor, distance information about a distance between the image projection unit and the projection area, wherein the determining of the reference line comprises determining the reference line, based on the obtained distance information.

* * * * *